(12) United States Patent
He et al.

(10) Patent No.: US 11,481,357 B2
(45) Date of Patent: Oct. 25, 2022

(54) ALBUM DISPLAY METHOD, ELECTRONIC DEVICE, AND STORAGE MEDIUM

(71) Applicant: Huawei Technologies Co., Ltd., Shenzhen (CN)

(72) Inventors: Liping He, Shanghai (CN); Zhiyan Yang, Shenzhen (CN); Kunqi Tong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/283,397

(22) PCT Filed: Sep. 25, 2019

(86) PCT No.: PCT/CN2019/107786
§ 371 (c)(1),
(2) Date: Apr. 7, 2021

(87) PCT Pub. No.: WO2020/073808
PCT Pub. Date: Apr. 16, 2020

(65) Prior Publication Data
US 2021/0382850 A1    Dec. 9, 2021

(30) Foreign Application Priority Data

Oct. 8, 2018   (CN) .......................... 201811168802.8
Oct. 30, 2018  (CN) .......................... 201811279520.5

(51) Int. Cl.
*G06F 3/048*      (2013.01)
*G06F 16/16*      (2019.01)
*G06F 3/0482*     (2013.01)
*G06F 3/04845*    (2022.01)
*G06F 3/04886*    (2022.01)

(52) U.S. Cl.
CPC .......... *G06F 16/168* (2019.01); *G06F 3/0482* (2013.01); *G06F 3/04845* (2013.01); *G06F 3/04886* (2013.01); *G06F 2203/04803* (2013.01)

(58) Field of Classification Search
CPC .............. G06F 3/0482; G06F 3/04845; G06F 3/04886; G06F 16/168
See application file for complete search history.

(56) References Cited

U.S. PATENT DOCUMENTS

2013/0091419 A1* 4/2013 Caliman ............... G06F 40/169
                                                   715/236
2013/0239063 A1* 9/2013 Ubillos ............... G06F 3/04845
                                                   715/838

(Continued)

FOREIGN PATENT DOCUMENTS

CN       1713573 A     12/2005
CN      102227729 A    10/2011
(Continued)

OTHER PUBLICATIONS

Khan, "How to Prevent a Directory From Being Scanned by Android Gallery," URL:https://www.addictivetips.com/mobile/how-to-prevent-a-directory-from-being-scanned-by-android-gallery/, total 5 pages (Apr. 19, 2011).

*Primary Examiner* — Claudia Dragoescu
(74) *Attorney, Agent, or Firm* — Leydig, Voit & Mayer, Ltd.

(57) ABSTRACT

A method includes: After scanning a picture in a first folder, an electronic device displays a first user interface, where the first user interface includes a first album that includes the picture in the first folder, a quantity of times the first album has been hidden, and a hide operation item, wherein the quantity of times which the first album has been hidden is from a server. After detecting an operation performed on the (Continued)

hide operation item, the electronic device adds a first file to the first folder, and changes a media type of the picture in the first folder to a non-media file type. In response to the operation performed on the hide operation item, the electronic device displays a second user interface on the electronic device, where the second user interface is an interface obtained after the first album on the first user interface is hidden.

7 Claims, 19 Drawing Sheets

(56) References Cited

U.S. PATENT DOCUMENTS

| | | | |
|---|---|---|---|
| 2014/0244697 A1 | 8/2014 | Li et al. | |
| 2015/0120790 A1* | 4/2015 | Sun | G06F 9/44505 |
| | | | 707/822 |
| 2016/0080542 A1 | 3/2016 | Park et al. | |
| 2020/0366798 A1* | 11/2020 | Ikuta | H04N 1/00177 |

FOREIGN PATENT DOCUMENTS

| | | |
|---|---|---|
| CN | 102970420 A | 3/2013 |
| CN | 103106266 A | 5/2013 |
| CN | 103136348 A | 6/2013 |
| CN | 103209170 A | 7/2013 |
| CN | 104573536 A | 4/2015 |
| CN | 105354506 A | 2/2016 |
| CN | 105915501 A | 8/2016 |
| CN | 105930437 A | 9/2016 |
| CN | 106856543 A | 6/2017 |
| CN | 106909855 A | 6/2017 |
| CN | 106933975 A | 7/2017 |
| CN | 109597542 A | 4/2019 |
| EP | 2854049 A1 | 4/2015 |

\* cited by examiner

ALBUM DISPLAY METHOD, ELECTRONIC DEVICE, AND STORAGE MEDIUM

CROSS-REFERENCE TO RELATED APPLICATIONS

This application is a National Stage of International Patent Application No. PCT/CN2019/107786 filed on Sep. 25, 2019, which claims priority to Chinese Patent Application No. 201811168802.8, filed on Oct. 8, 2018 and Chinese Patent Application No. 201811279520.5, filed on Oct. 30, 2018. All of the aforementioned applications are hereby incorporated by reference in their entireties.

TECHNICAL FIELD

This application relates to the communications field, and in particular, to an album display method, an electronic device, and a storage medium.

BACKGROUND

With popularization and development of electronic devices, the electronic devices have become an important part of daily life. To meet complex service requirements of users, the electronic devices provide an increasing quantity of functions, and various applications on the electronic devices emerge accordingly, thereby bringing greater convenience to users.

However, when a user uses various categories of applications on an electronic device, a comparatively large amount of cached data is generated. For example, an application generates a cached picture or a cached video. In addition, the amount of cached data increases, consequently causing many troubles to the user. For example, when the user needs to search for or share a specific picture in an album, many irrelevant cache albums may be displayed, resulting in a problem that it is inconvenient for the user to search for the picture.

SUMMARY

This application provides an album display method, an electronic device, and a storage medium, which are used to hide a to-be-hidden album, so as to help a user manage a picture.

According to a first aspect, this application provides an album display method, including: After scanning a picture in a first folder, an electronic device displays a first user interface on the electronic device. The first user interface includes a first album that includes the picture in the first folder, a quantity of times the first album has been hidden by a user, and a hide operation item. The hide operation item is used to hide the first album. After the electronic device detects an operation performed on the hide operation item, the electronic device adds a first file to the first folder, and changes a media type of the picture in the first folder to a non-media file type. The first file is used to enable the electronic device to skip scanning the picture in the first folder. In response to the operation performed on the hide operation item, the electronic device displays a second user interface on the electronic device. The second user interface is an interface obtained after the first album on the first user interface is hidden.

According to this solution, the first user interface displayed on the electronic device includes a current quantity of times the first album has been hidden by a user. In this way, a current status of that the first album is hidden can be quantified, thereby helping a user determine, with reference to the quantity of times the first album has been hidden by the user, whether to hide the first album. In addition, by hiding the first album, it can be implemented that the hidden first album is no longer displayed in a gallery, thereby facilitating the user's search for a desired album in the gallery.

In a possible implementation, the first user interface further includes a hidden album operation item. After detecting an operation performed on the hidden album operation item, the electronic device displays a third user interface. The third user interface includes the first album and an unhide operation item. The unhide operation item is used to unhide the first album. By performing an operation on the hidden album operation item, the currently hidden first album can be displayed, thereby helping a user track the hidden first album.

When a user needs to unhide the hidden first album, in a possible implementation, after the electronic device detects an operation performed on the unhide operation item on the third user interface, the electronic device deletes the first file in the first folder, and changes the media type of the picture (that is, the picture in the hidden first album) in the first folder to a picture type. In response to the operation performed on the unhide operation item, the electronic device displays a fourth user interface on the electronic device. The fourth user interface includes the first album that is unhidden. In this way, the hidden first album can be unhidden, and further, the first album that is unhidden can be displayed again in the gallery, thereby enabling a user to flexibly select albums to be displayed in the gallery.

In a possible implementation, the first file is a .nomedia file.

To facilitate displaying, on the first user interface, of a current quantity of times the first album has been hidden, and help a user learn of, in a timely manner, the current quantity of times the first album has been hidden, the electronic device receives hiding information from a server. The hiding information includes the first album and the quantity of times the first album has been hidden by the user.

In a possible implementation, the electronic device may receive a list of suspected to-be-hidden albums from the server, and determine the first album of the electronic device based on an album in the gallery and the list of suspected to-be-hidden albums. The first album is a to-be-hidden album.

According to a second aspect, this application provides an album display method, including: A server obtains at least one hidden album, where the hidden album may be a first album on which an operation of a hide operation item is performed, counts a quantity of times the hidden album has been hidden by a user, and pushes, to an electronic device, the quantity of times the hidden album has been hidden by the user.

In a possible implementation, the server may obtain a list of suspected to-be-hidden albums in advance, and push the list of suspected to-be-hidden albums to the electronic device.

According to a third aspect, this application provides an electronic device, including a touchscreen, a memory, and one or more processors. The touchscreen is configured to display a user interface. The memory stores one or more computer programs. The one or more processors are configured to invoke the one or more computer programs stored in the memory, to perform the method according to any one of the first aspect or the possible implementations of the first aspect.

According to a fourth aspect, this application provides a server, including a processor, a memory, and a transceiver. The memory stores one or more computer programs. The one or more processors are configured to invoke the one or more computer programs stored in the memory, to perform the method according to any one of the second aspect or the possible implementations of the second aspect, and control the transceiver to receive a signal and send a signal.

According to a fifth aspect, this application provides an electronic device. The electronic device includes modules/units that perform the method according to any one of the first aspect or the possible implementations of the first aspect. These modules/units may be implemented by hardware, or may be implemented by hardware by executing corresponding software.

According to a sixth aspect, this application provides a server. The server includes modules/units that perform the method according to any one of the second aspect or the possible implementations of the second aspect. These modules/units may be implemented by hardware, or may be implemented by hardware by executing corresponding software.

According to a seventh aspect, this application provides a computer storage medium. The computer storage medium stores a program instruction. When the program instruction runs on an electronic device, the electronic device is enabled to perform the method according to any one of the first aspect or the possible implementations of the first aspect; or when the program instruction runs on a server, the server is enabled to perform the method according to any one of the second aspect or the possible implementations of the second aspect.

According to an eighth aspect, this application provides a computer program product. When the computer program product runs on an electronic device, the electronic device is enabled to perform the method according to any one of the first aspect or the possible implementations of the first aspect; or when the computer program product runs on a server, the server is enabled to perform the method according to any one of the second aspect or the possible implementations of the second aspect.

DESCRIPTION OF EMBODIMENTS

The embodiments disclosed in this application may be applied to an electronic device. In some embodiments of this application, the electronic device may be a portable electronic device including a function such as a personal digital assistant and/or a music player, for example, a mobile phone, a tablet computer, a wearable device with a wireless communication function (for example, a smartwatch or a smart band), or a vehicle-mounted device. An example embodiment of the portable electronic device includes but is not limited to a portable electronic device using iOS®, Android®, Microsoft®, or another operating system. The portable electronic device may alternatively be, for example, a laptop computer (Laptop) with a touch-sensitive surface (for example, a touch panel). It should be further understood that in some other embodiments of this application, the electronic device may alternatively be a desktop computer with a touch-sensitive surface (for example, a touch panel).

It should be understood that an application program that can be supported by an electronic device in this application includes a gallery. In addition, the application program supported by the electronic device may further include a plurality of other applications, for example, a video player, a music player, picture management, a camera, a browser, and Taobao.

Figure 1:
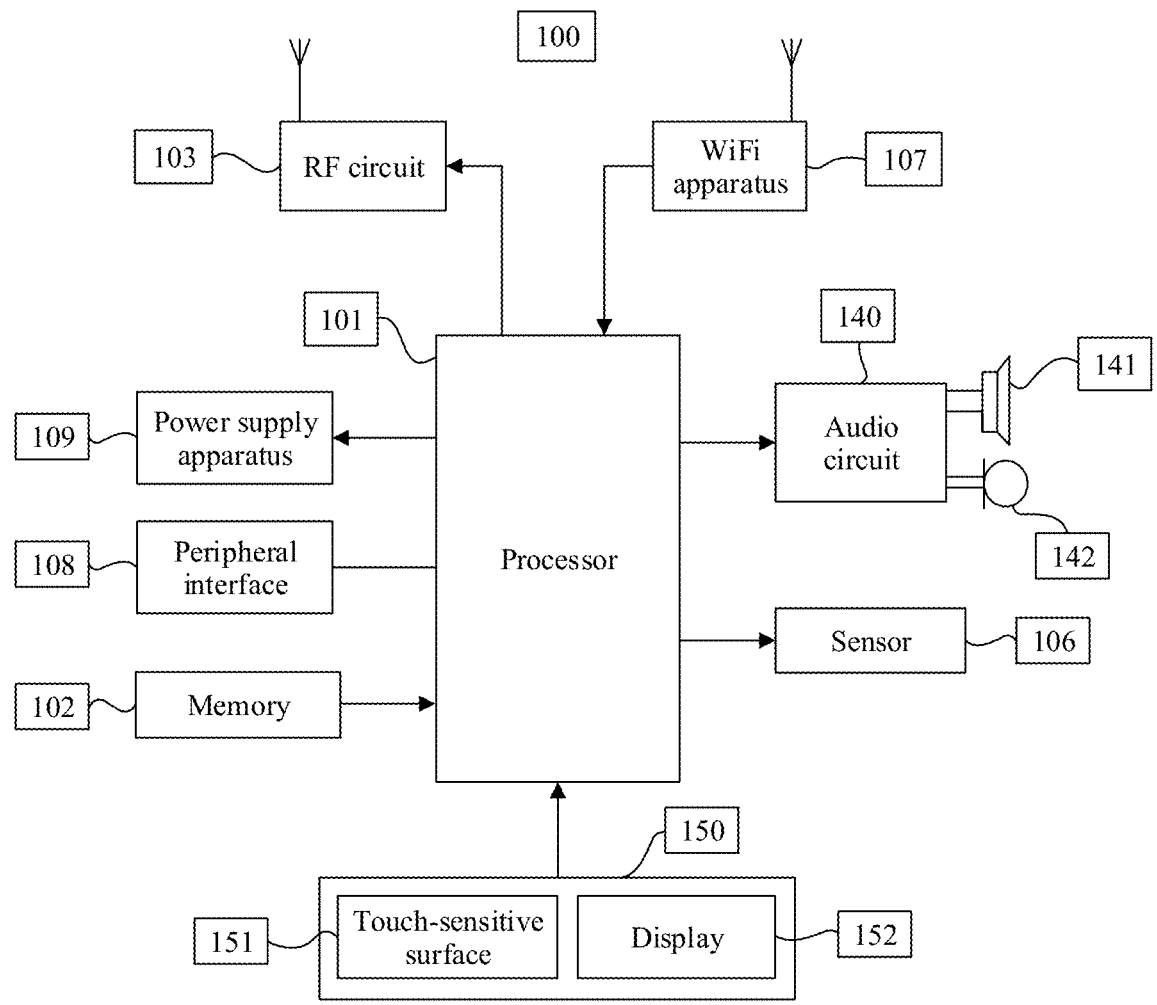
FIG. 1 is a schematic structural diagram of an electronic device according to an embodiment of this application.

FIG. 1 is a schematic structural diagram of an electronic device. It should be understood that an electronic device structure shown in FIG. 1 is merely an example. The electronic device 100 may have components more or fewer than those shown in FIG. 1, or may combine two or more components, or may have different component configurations. Various components shown in FIG. 1 may be implemented in hardware including one or more signal processing circuits and/or an application-specific integrated circuit, software, or a combination of hardware and software.

The electronic device 100 may include one or more processors 101, a memory 102, a radio frequency (RF) circuit 103, an audio circuit 140, a loudspeaker 141, a microphone 142, a touchscreen 150, one or more sensors 106, a wireless fidelity (Wi-Fi) apparatus 107, a peripheral interface 108, and a power supply apparatus 109. These components may communicate with each other by using one or more communications cables (for example, a bus). A person skilled in the art may understand that the hardware structure shown in FIG. 1 does not constitute a limitation on the electronic device 100, and the electronic device 100 may include components more or fewer than those shown in the figure, or combine some components, or have different component arrangements.

The processor 101 is a control center of the electronic device 100, is connected to all the parts of the electronic device 100 by using various interfaces and lines, and by running or executing an application program (APP) stored in the memory 102 and by invoking data and an instruction that are stored in the memory 102, performs various functions of the electronic device 100 and processes data. For example, the processor 101 may hide a picture cached by an application.

In some embodiments, the processor 101 may include one or more processing units. Further, an application processor and a modem processor may be integrated in the processor 101. The application processor mainly processes an operating system, a user interface, an application program, and the like, and the modem processor mainly processes wireless communication. It may be understood that the modem processor may be alternatively not integrated in the processor 101. For example, the processor 101 may be a Kirin 970 chip. In some other embodiments of this application, the processor 101 may further include a fingerprint verification chip, which is configured to verify a collected fingerprint.

The memory 102 may be configured to store an application program, data, and various operating systems, for example, IOS®, Android®, Microsoft®, or another operating system. The memory 102 mainly includes a program storage area and a data storage area. The program storage area may store an operating system and an application program required by at least one function (such as a sound play function and an image play function). The data storage area may store data created when the electronic device 100 is used, for example, a photo or a video shot by a user by using the electronic device 100, or audio recorded by a user by using the electronic device 100. The data storage area may further store a picture file downloaded by a user, a cached album file generated when a user uses an application, or the like. In addition, the memory 102 may include a nonvolatile memory, for example, a magnetic disk storage device or a flash memory device. It may be understood that a storage application program may be a memory that stores data, for example, a photo or a video.

The RF circuit 103 may be configured to receive and send radio signals in an information receiving/sending process or a call process. Specifically, the RF circuit 103 may receive downlink data from a base station, and send the downlink data to the processor 101 for processing. In addition, the RF circuit 103 may further send uplink data to the base station. The RF circuit 103 usually includes but is not limited to an antenna, at least one amplifier, a transceiver, a coupler, a low noise amplifier, and a duplexer. In addition, the RF circuit 103 may also perform wireless communication with another device. Any communication standard or protocol may be used for the wireless communication, including but not limited to: global system for mobile communications, general packet radio service, code division multiple access, wideband code division multiple access, long term evolution, email, and short message service.

The audio circuit 140, the loudspeaker 141, and the microphone 142 may provide an audio interface between a user and the electronic device 100. The audio circuit 140 may convert received audio data into an electrical signal, and send the electrical signal to the loudspeaker 141; and the loudspeaker 141 converts the electrical signal into a sound signal and outputs the sound signal. On the other hand, the microphone 142 may convert a collected sound signal into an electrical signal; and the audio circuit 140 receives the electrical signal, converts the electrical signal into audio data, and then outputs the audio data to the RF circuit 103 for sending the audio data to, for example, a mobile phone, or stores the audio data in the memory 102 for further processing.

The touchscreen 150 may include a touch-sensitive surface 151 and a display 152. The touch-sensitive surface 151 (for example, a touch panel) may collect a touch event performed by a user of the electronic device 100 on or near the touch-sensitive surface 151 (for example, an operation performed by the user on or near the touch-sensitive surface 151 by using any proper object such as a finger or a stylus), and send collected touch information to another component such as the processor 101. The touch event performed by the user near the touch-sensitive surface 151 may be referred to as a floating touch. The floating touch may mean that the user does not need to directly touch a touchpad for selecting, moving, or dragging a target (for example, an app icon), and the user only needs to be located near an electronic device to perform a desired function. In a floating touch application scenario, terms such as "touch" and "contact" do not imply direct contact with the touchscreen 150, but contact in a vicinity of or near the touchscreen 150. The touch-sensitive surface 151 that can implement a floating touch may be implemented by using a capacitive type, an infrared light sensing type, an ultrasonic wave type, or the like.

The touch-sensitive surface 151 may include two parts: a touch detection apparatus and a touch controller. The touch detection apparatus detects a touch position of a user, detects a signal generated by a touch operation, and transmits the signal to the touch controller. The touch controller receives touch information from the touch detection apparatus, converts the touch information into touch point coordinates, and then sends the touch point coordinates to the processor 101. The touch controller may further receive and execute an instruction sent by the processor 101. In addition, the touch-sensitive surface 151 may be implemented by using a plurality of types, such as a resistive type, a capacitive type, an infrared type, and a surface acoustic wave type.

The display (also referred to as a display screen) 152 may be configured to display information entered by a user or information provided for a user, display various menus of the electronic device 100, and the like. For example, a display in any embodiment of this application may be an liquid crystal display (LCD) or an organic light-emitting diode (OLED). For example, an active matrix organic light-emitting diode (AMOLED) is used.

It should be understood that the touch-sensitive surface 151 may cover the display 152. After detecting a touch event performed on or near the touch-sensitive surface 151, the touch-sensitive surface 151 transfers the touch event to the processor 101 for determining a type of the touch event. Then, the processor 101 may provide corresponding visual output on the display 152 based on the type of the touch event. In FIG. 1, the touch-sensitive surface 151 and the display 152 are used as two independent components to implement input and output functions of the electronic device 100. However, in some embodiments, the touch-sensitive surface 151 and the display 152 may be integrated to implement the input and output functions of the electronic device 100. It may be understood that the touchscreen 150 may be formed through stacking of a plurality of layers of materials. A touch-sensitive surface layer and a display layer are shown in this application, and another layer is not described in detail in this application. In addition, in some other embodiments of this application, the touch-sensitive surface 151 may cover the display 152, and a size of the touch-sensitive surface 151 may be greater than a size of the display 152, so that the display 152 is completely covered under the touch-sensitive surface 151. Alternatively, the touch-sensitive surface 151 may be configured on the front of the electronic device 100 in a form of a full panel, that is, any touch performed by a user on the front of the electronic device 100 can be sensed by the electronic device. In this way, full-touch experience on the front of the electronic device can be implemented. In some other embodiments, when the touch-sensitive surface 151 is configured on the front of the electronic device 100 in the form of a full panel, the display 152 may also be configured on the front of the electronic device 100 in the form of a full panel. In this way, a bezel-less structure can be implemented on the front of the electronic device. In some other embodiments of this application, the touchscreen 150 may further include a series of pressure sensor arrays, so that the electronic device can detect pressure applied to the touchscreen 150 by a touch event.

The one or more sensors 106 may be, for example, a light sensor, a motion sensor, or another sensor. Specifically, the light sensor may include an ambient light sensor and a proximity light sensor. The ambient light sensor may adjust luminance of the display 152 based on brightness of ambient light. When answering a call by using the electronic device 100, a user moves the electronic device 100 to an ear. If the proximity light sensor detects that the electronic device 100 moves close to the ear, the proximity light sensor may notify the processor 101 of an event that the electronic device 100 moves close to the ear, and the processor 101 controls the display 152 to darken. As a type of motion sensor, an accelerometer sensor may detect acceleration magnitudes in all directions (usually in three axes), may detect a magnitude and a direction that are of gravity of the electronic device 100, and may be configured to recognize a posture application of the electronic device (such as switching between a landscape mode and a portrait mode, a related game, and magnetometer posture calibration), a vibration related function (such as a pedometer and stroke), and the like.

In some embodiments of this application, the sensors 106 may further include a fingerprint sensor. For example, the fingerprint sensor may be configured on the back of the electronic device 100 (for example, below a rear-facing camera) or on the front of the electronic device 100 (for example, below the touchscreen 150). In addition, the fingerprint sensor may be alternatively configured in the touchscreen 150 to implement a fingerprint recognition function. In other words, the fingerprint sensor may be integrated with the touchscreen 150 to implement the fingerprint recognition function of the electronic device 100. In this case, the fingerprint sensor may be configured in the touchscreen 150, and may be a part of the touchscreen 150, or may be configured in the touchscreen 150 in another manner. In addition, the fingerprint sensor may be alternatively implemented as a full-screen fingerprint sensor. Therefore, the touchscreen 150 may be considered as a panel on which a fingerprint can be collected at any position. In some embodiments, the fingerprint sensor may process a collected fingerprint (for example, verify the collected fingerprint), and send a fingerprint processing result (for example, a result indicating whether the fingerprint passes verification) to the processor 101, and the processor 101 performs corresponding processing based on the fingerprint processing result. In some other embodiments, the fingerprint sensor may alternatively send a collected fingerprint to the processor 101, so that the processor 101 processes the fingerprint (for example, fingerprint verification). The fingerprint sensor in this application may use any type of sensing technology, including but not limited to an optical sensing technology, a capacitive sensing technology, a piezoelectric sensing technology, and an ultrasonic wave sensing technology. In addition, other sensors may be further configured for the electronic device 100, such as a gyroscope, a barometer, a hygrometer, a thermometer, and an infrared sensor, and details are not described herein.

The Wi-Fi apparatus 107 is configured to provide the electronic device 100 with network access that complies with a Wi-Fi-related standard protocol. The electronic device 100 may be connected to a Wi-Fi wireless access point by using the Wi-Fi apparatus 107, thereby helping a user access streaming media, browse a web page, and the like. The Wi-Fi apparatus 107 provides the user with wireless broadband internet access. In some other embodiments, the Wi-Fi apparatus 107 may be alternatively used as a Wi-Fi wireless access point, and may provide Wi-Fi network access for another electronic device.

The peripheral interface 108 is configured to provide various interfaces for an external input/output device (for example, a keyboard, a mouse, an external display, an external memory, or a subscriber identity module card). For example, the electronic device 100 is connected to a mouse through a universal serial bus interface, and is connected, through a metal contact on a card slot for a subscriber identity module card, to a SIM card provided by an operator. The peripheral interface 108 may be configured to couple the external input/output peripheral device to the processor 101 and the memory 102.

The electronic device 100 may further include the power supply apparatus 109 (for example, a battery and a power management chip) that supplies power to each component. The battery may be logically connected to the processor 101 by using the power management chip, so as to implement functions such as charging management, discharging management, and power consumption management by using the power supply apparatus 109.

In a possible implementation, the electronic device 100 may further include a Bluetooth apparatus, a positioning apparatus, a camera (for example, a front-facing camera or a rear-facing camera), a camera flash, a micro projection apparatus, a near field communication (NFC) apparatus, and the like. Details are not described herein. The front-facing camera may be configured to capture facial characteristic information. The processor 101 may perform face recognition based on the facial characteristic information, and then perform subsequent processing.

All the following embodiments may be implemented in an electronic device with the foregoing hardware structure (for example, a mobile phone or a tablet computer).

Figure 2:
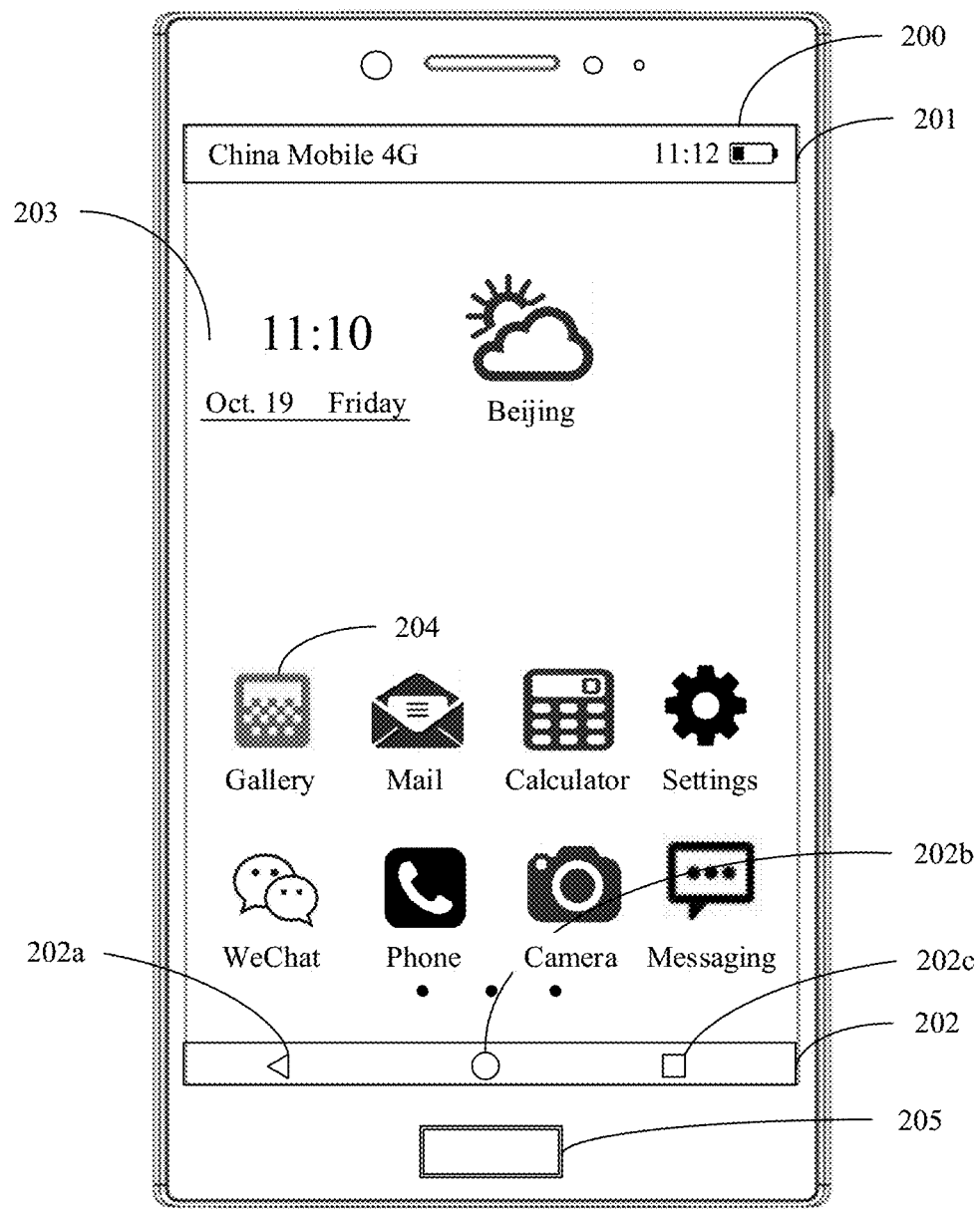
FIG. 2 is a schematic diagram of a home screen of an electronic device according to an embodiment of this application.
Figure 3A:
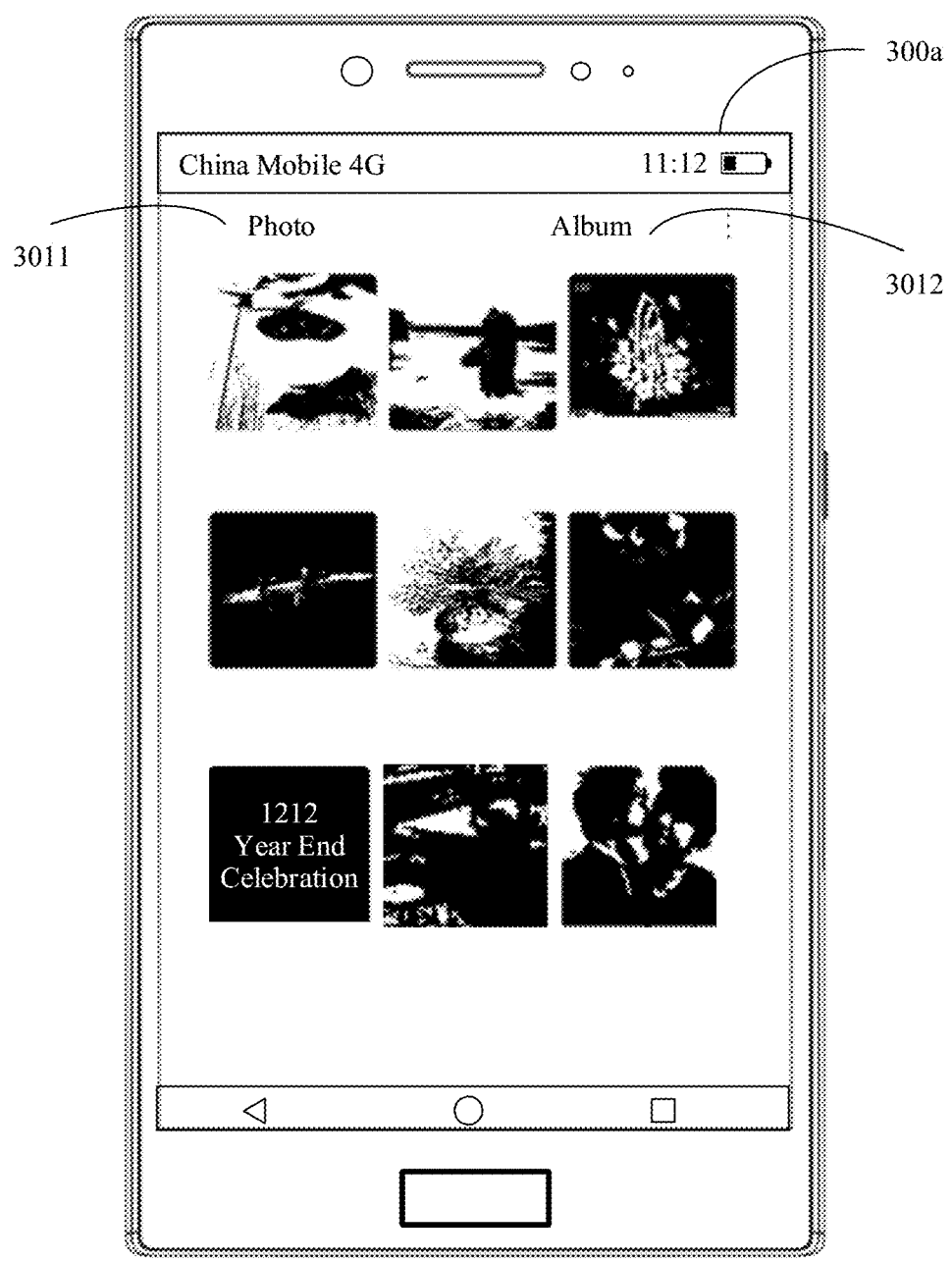
FIG. 3a is a schematic diagram of a user interface of a gallery in the prior art.
Figure 3B:
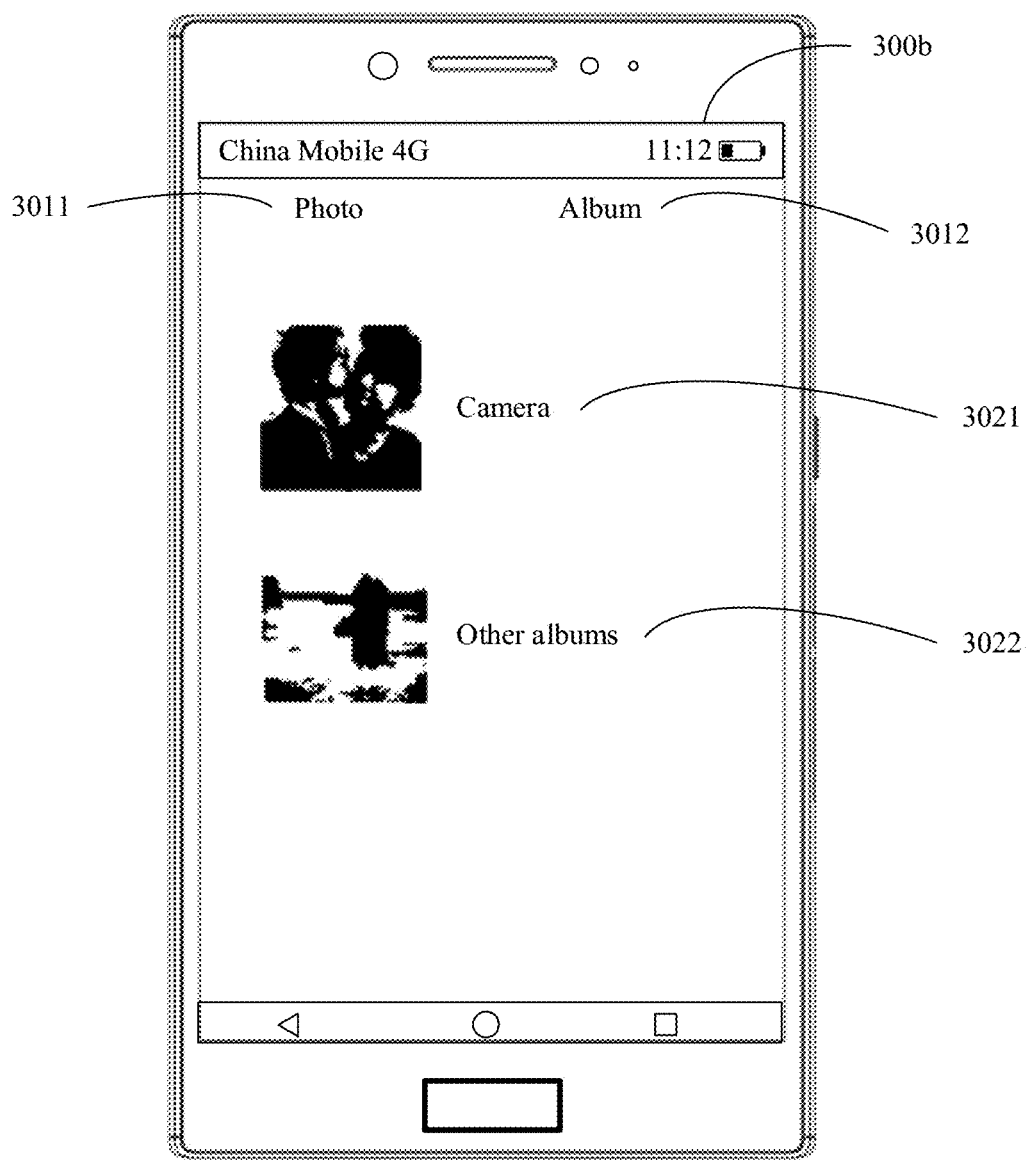
FIG. 3b is a schematic diagram of another user interface of a gallery in the prior art.

FIG. 2 shows an example of a schematic diagram of a home screen displayed on a touchscreen of an electronic device according to this application. The touchscreen may be the touchscreen 150 in FIG. 1. The home screen 200 may include a status bar 201, a hideable navigation bar 202, a time and weather widget (Widget) 203, and a plurality of application program icons, for example, a Gallery 204. The status bar 201 may include an operator name (China Mobile), a mobile network identity (for example, 4G), time, and remaining power. The navigation bar 202 may include a back button 202a, a home button 202b, and a menu button 202c. In some embodiments, the back button may also be referred to as a return button or a back button; the home button may also be referred to as a home screen button; and the menu button may also be referred to as a historical task view button. In addition, it may be understood that in some other embodiments, the status bar 201 may further include a Bluetooth icon, a Wi-Fi icon, an external device icon, and the like. After the electronic device 100 detects an operation performed by a user finger (or a stylus or the like) on an icon of a specific application program, in response to the operation, the electronic device 100 starts the application program and displays a user interface of the application program on the touchscreen 150. For example, after detecting an operation performed on the Gallery 204, in response to the operation, the electronic device 100 may display a user interface 300a of the Gallery on the touchscreen 150 of the electronic device 100. As shown in FIG. 3a, the user interface 300a may include a Photo operation item 3011, an Album operation item 3012, and pictures in the Gallery. After detecting that an operation is performed on the Album operation item 3012, in response to the operation, the electronic device 100 may display, on the touchscreen 150 of the electronic device 100, another user interface 300b that is of the Gallery and that is shown in FIG. 3b. The user interface 300b includes an album of "Camera" 3021 and "Other albums" 3022. A picture in the album of the "Camera" 3021 is shot by a user by using a camera. Pictures in the "Other albums" 3022 are pictures cached by an application on the electronic device 100, and/or pictures captured by the user, and/or pictures downloaded by the user from a web page, and/or the like.

Figure 3C:
FIG. 3c is a schematic diagram of a user interface of "Other albums" in the prior art.

After detecting an operation performed on the "Other albums", in response to the operation, the electronic device 100 may display a user interface 300c of the "Other albums" on the touchscreen 150 of the electronic device 100. As shown in FIG. 3c, the user interface 300c may include pictures in the "Other albums" in the Gallery. For aesthetics of the user interface, the pictures in the "Other albums" may be classified. Names of albums obtained through classification may be Food, Seaside, Weekend, Sports, Travel, and Flowers, and there may be a cache album generated by an application, and the like. Each album includes one or more pictures. The pictures in the "Other albums" may be classified by the user based on a habit or a hobby, or may be automatically classified by the electronic device by recognizing content of the pictures. That the user classifies the pictures in the "Other albums" based on a habit or a hobby may be that the user moves a category of pictures to a folder and then names the file. A name may be determined based on the category of the pictures in the folder. A cache album generated by an application may be, for example, a "Taobao" album and a "Xiaohongshu" album. A picture in the "Taobao" album is obtained through caching performed by a Taobao application, and a picture in the "Xiaohongshu" album is obtained through caching performed by a "Xiaohongshu" application. The "Taobao" album and the "Xiaohongshu" album are some examples of a first album.

In some other embodiments, the electronic device 100 may further include a home screen key 205, as shown in FIG. 2. The home screen key 205 may be a physical key. The home screen key 205 is configured to make, based on an operation of the user, for example, pressing the home screen key 205 by the user, the electronic device 100 return to the home screen from a user interface displayed on the touchscreen 150. This can make it convenient for the user to view the home screen at any time and perform an operation on a control (for example, an icon) on the home screen. In some embodiments of this application, the home screen key 205 may be further integrated with a fingerprint sensor. In this way, when the user presses the home screen key 205, the electronic device 100 may then collect a fingerprint and further confirm an identity of the user. In some other embodiments, the electronic device 100 may not include the home screen key 205, and may implement a function of the home screen key 205 by using the virtual key home button 202b.

Figure 4A:
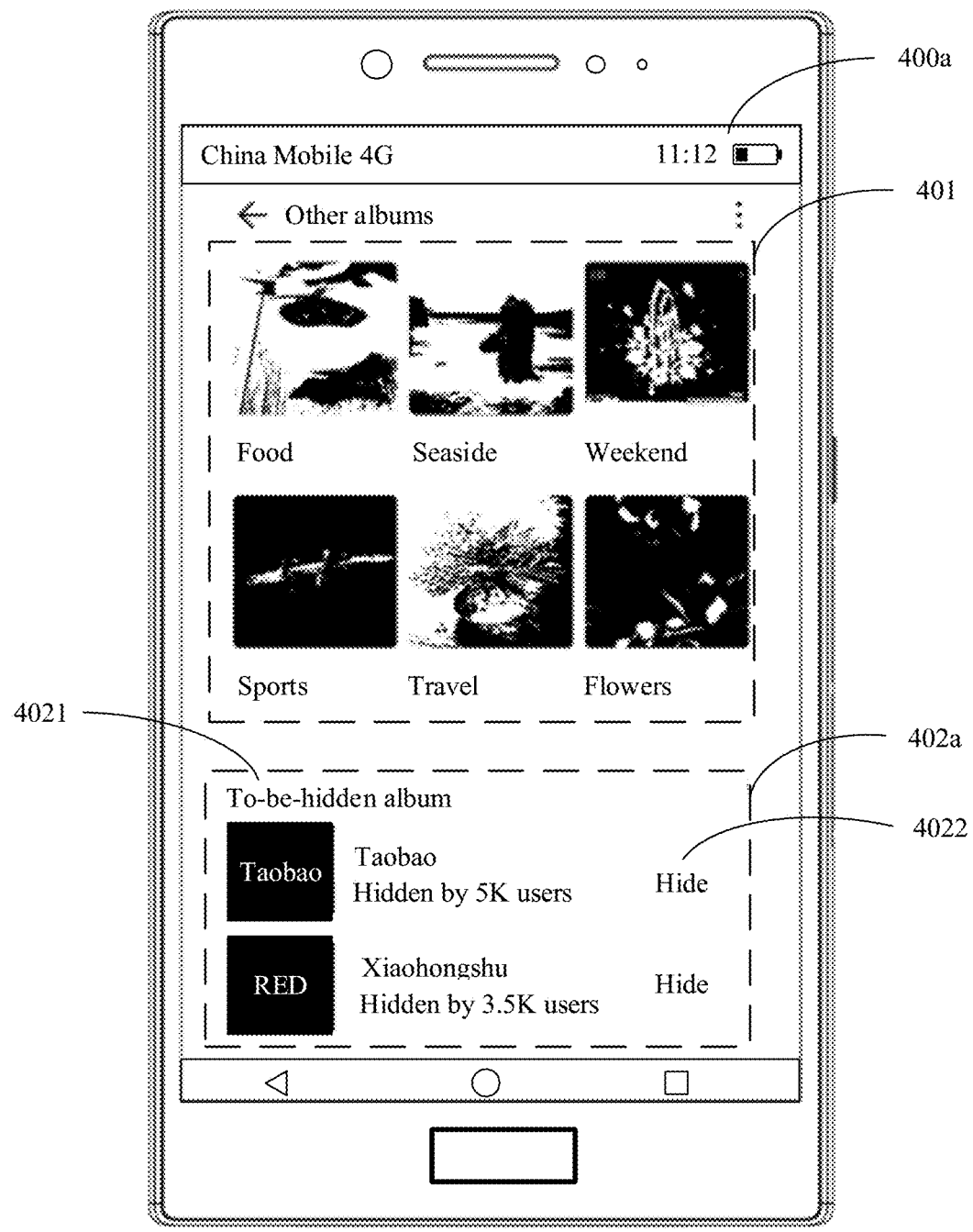
FIG. 4a is a schematic diagram of a user interface of "Other albums" according to an embodiment of this application.

A comparatively large quantity of cache albums generated by applications may be displayed on the user interface 300, causing inconvenience to the user when the user needs to search for or share a picture. To help the user manage albums in the electronic device 100, some cache albums in the electronic device 100 may be hidden. After the user hides a specific album, the hidden album is no longer displayed on a user interface, and the hidden album also cannot be found by the user through searching. For example, after the "Taobao" album is hidden, a picture cached by "Taobao" is no longer displayed on an interface of "Other users", and the picture cached by "Taobao" cannot be found through searching either. FIG. 4a shows a user interface 400a (that is, an example of a first user interface) of "Other albums" that an electronic device 100 according to this application displays on a touchscreen 150. As shown in FIG. 4a, the user interface 400a may include a first area 401 and a second area 402a. The first area 401 includes some albums of "Other albums" in a Gallery, for example, albums named Food, Seaside, Weekend, Sports, Travel, and Flowers. Various categories of albums in the first area 401 may be classified by a user based on a habit, or may be automatically classified by the electronic device by recognizing picture content. The second area 402a may also be referred to as a to-be-hidden album area or a suspected cache album area. The second area 402a includes a To-be-hidden album operation item 4021, a name of a first album (the first album is a to-be-hidden album), a quantity of times the first album has been hidden by a user, and a Hide operation item 4022. The first album may include cache albums generated by some applications in the electronic device. In this application, cache albums generated by "Taobao" and "Xiaohongshu" are used as examples for description. As shown in FIG. 4a, names of the first albums are "Taobao" and "Xiaohongshu", where "Taobao" has been hidden by 5K (that is, 5000) users, and "Xiaohongshu" has been hidden by 3.5K (that is, 3500) users. In some embodiments, the albums in the first area 401 may be displayed in a form of a grid, or may be displayed in a form of a list. Names of the first albums in the second area 402a may also be displayed in a form of a grid, or may be displayed in a form of a list.

The first user interface displayed on the electronic device includes a current quantity of times the first album has been hidden by a user. In this way, a current status of that the first album is hidden can be quantified, thereby helping a user determine, with reference to the quantity of times the first album has been hidden by the user, whether to hide the first album. In addition, by hiding the first album, it can be implemented that the hidden first album is no longer displayed in the Gallery, thereby facilitating the user's search for a desired album in the Gallery.

In some embodiments, the Hide operation item 4022 may be implemented in any one of the following manners: displaying a "Hide" button on the touchscreen 150, displaying an "ON" button on the touchscreen 150, and displaying "Flick left or flick right" on the touchscreen 150. A specific implementation of the Hide operation item 4022 is not limited in this application.

Figure 4B:
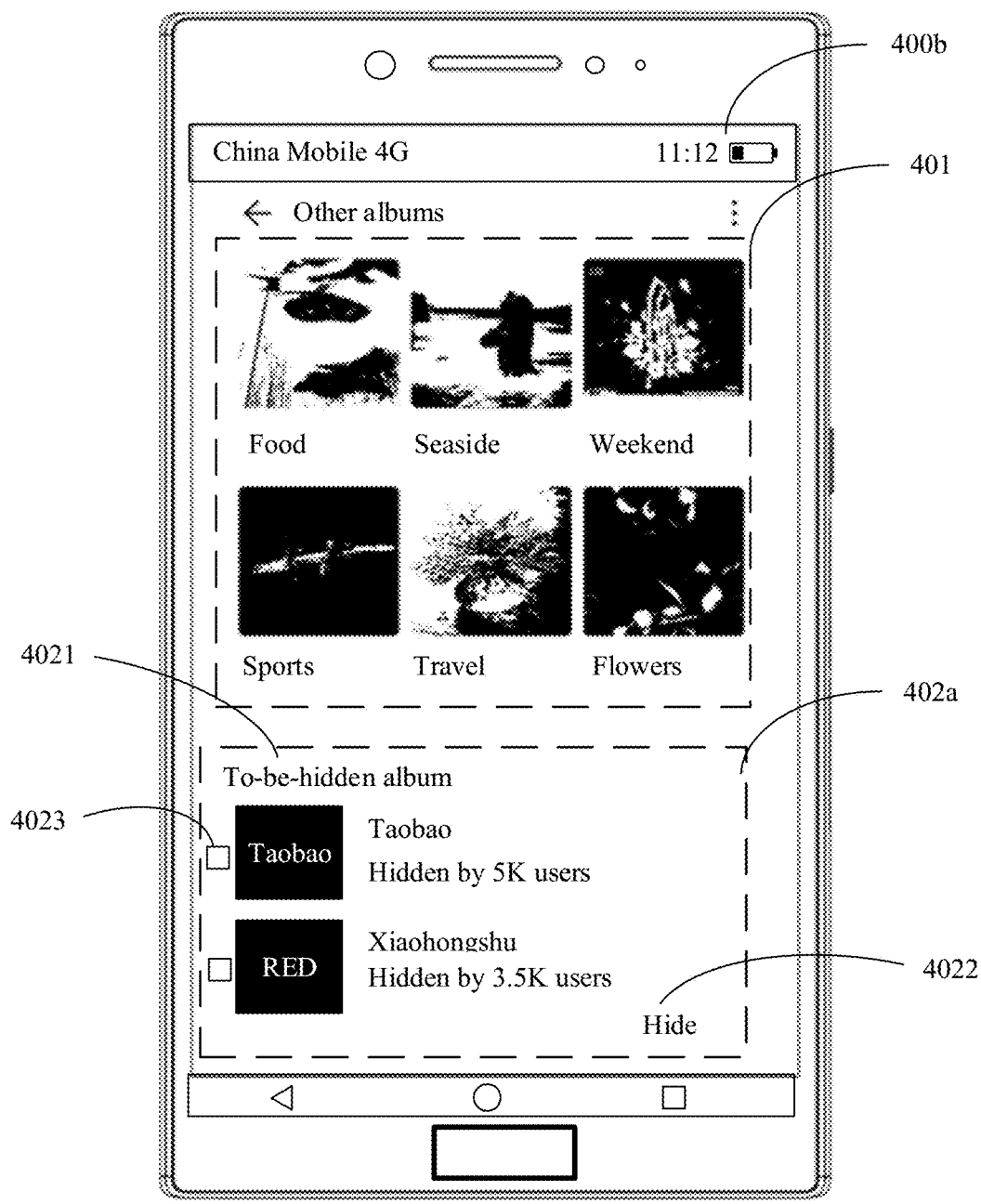
FIG. 4b is a schematic diagram of another user interface of "Other albums" according to an embodiment of this application.

In a possible implementation, one Hide operation item 4022 is correspondingly set for one to-be-hidden album. As shown in FIG. 4a, one Hide operation item 4022 may be located on a right side of one first album (a to-be-hidden album). For example, one Hide operation item is set on a right side of "Taobao", and one Hide operation item is also set on a right side of "Xiaohongshu". In another possible implementation, it may alternatively be a case shown in FIG. 4b, which shows another user interface 400b of "Other albums" that an electronic device 100 displays on a touchscreen 150. As shown in FIG. 4b, all first albums in the second area 402a correspond to one Hide operation item 4022, and one select operation item 4023 is set in front of each first album. For example, one select operation item 4023 is set in front of each of the "Taobao" album and the "Xiaohongshu" album, and one Hide operation item 4022 is set on a lower right side of the "Taobao" album and the "Xiaohongshu" album. If detecting that an operation is performed on a select operation item 4023 in front of any first album, the electronic device 100 may determine that a hide operation is to be performed on the first album, or it may be understood as that the first album is selected. Then, after detecting an operation performed on the Hide operation item 4022, the electronic device 100 may hide the selected first album. For example, after detecting that an operation is performed on the select operation item 4023 in front of the "Taobao" album, and then detecting an operation performed on the Hide operation item 4022, the electronic device 100 may hide the "Taobao" album. If detecting that an operation is performed on select operation items 4023 in front of a plurality of first albums at a time, the electronic device 100 may determine that a hide operation is to be performed on the plurality of first albums at a time. Then, after detecting an operation performed on the Hide operation item 4022, in response to the operation, the electronic device 100 may hide, at a time, the plurality of first albums that need to be hidden. In this way, efficiency of hiding the first albums by the user can be improved. For example, after detecting that an operation is performed on both the select operation items 4023 in front of the "Taobao" album and the "Xiaohongshu" album, and then detecting an operation performed on the Hide operation item 4022, the electronic device 100 may hide the "Taobao" album and the "Xiaohongshu" album.

Figure 4C:
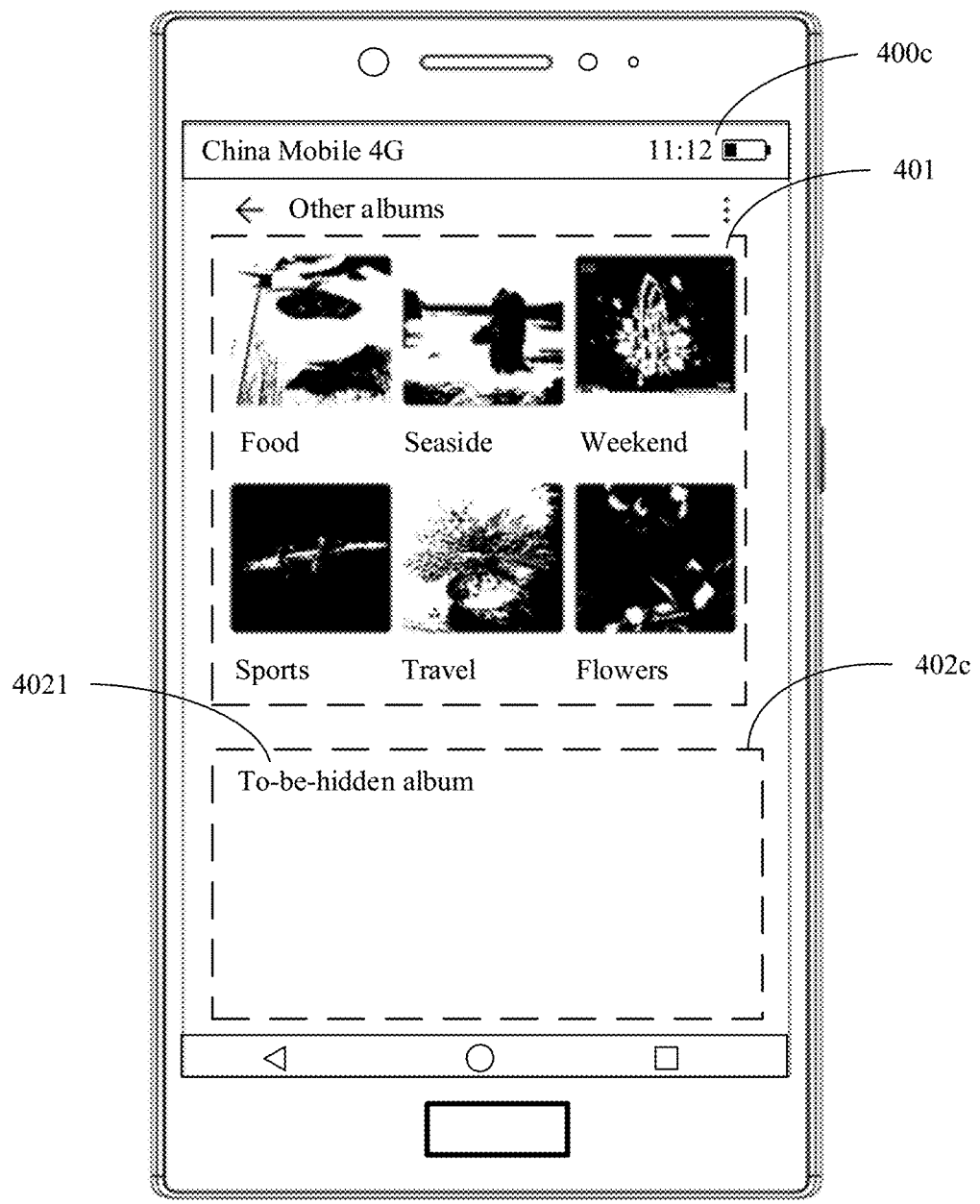
FIG. 4c is a schematic diagram of another user interface of "Other albums" according to an embodiment of this application.

In some embodiments, the name of the first album, the quantity of times the first album has been hidden by the user, and the Hide operation item 4022 that are in the second area 402a may be hidden. It may also be understood as that only the To-be-hidden album operation item 4021 is displayed in the second area. FIG. 4c shows another user interface 400c of "Other albums" that the electronic device 100 displays on the touchscreen 150. The user interface 400c includes the first area 401 and a second area 402c, and the To-be-hidden album operation item 4021 is displayed in the second area 402c. After detecting that the user triggers the To-be-hidden album operation item 4021, the electronic device 100 may display the name of the first album, the quantity of times the first album has been hidden by the user, and the Hide operation item 4022 on the user interface 400c. It may also be understood as that when detecting that the user triggers the To-be-hidden album operation item 4021, the electronic device 100 may display the user interface 400a shown in FIG. 4a, or may display the user interface 400b shown in FIG. 4b.

In the following embodiment, "Taobao" is used as an example for description.

Figure 4D:
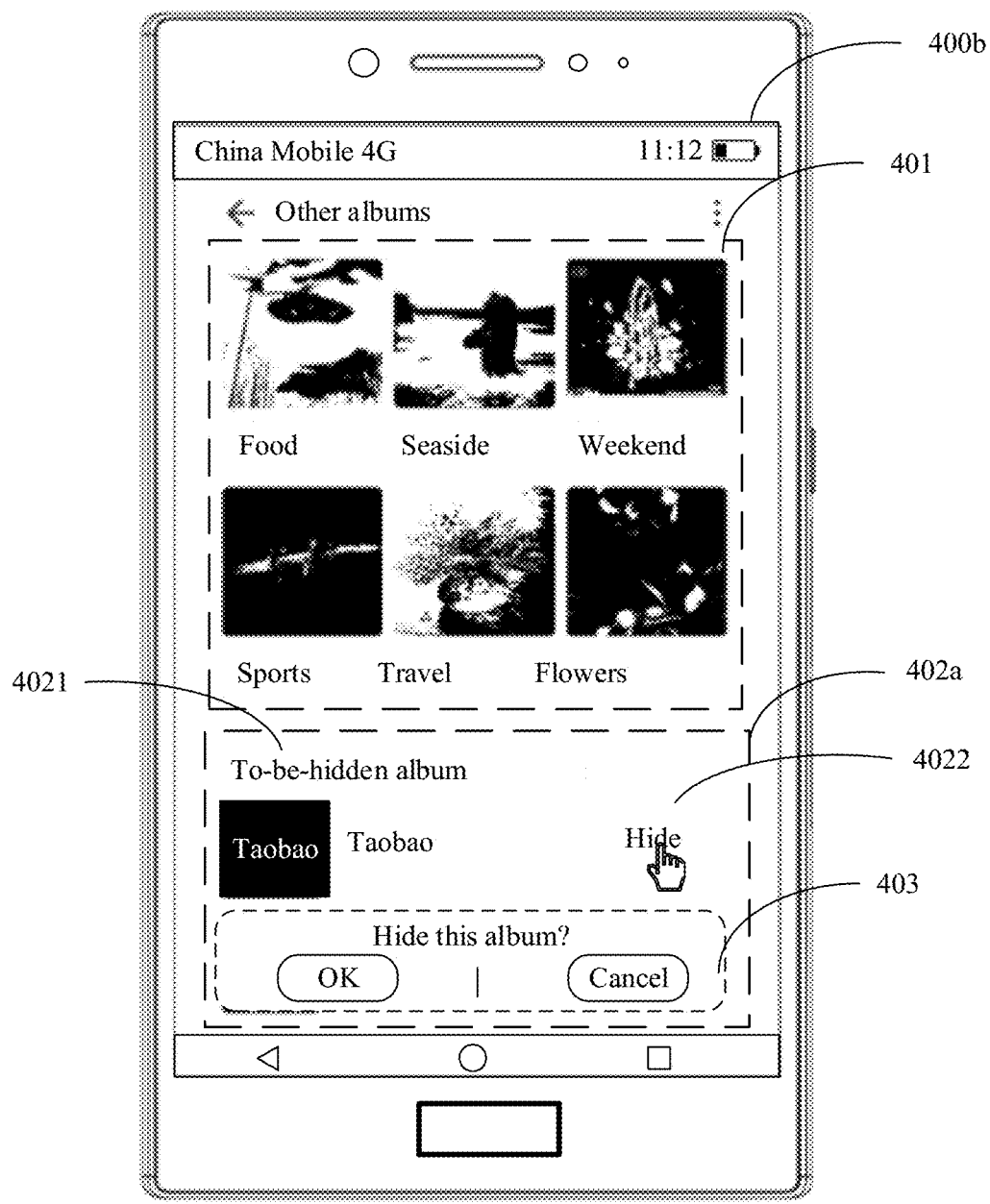
FIG. 4d is a schematic diagram of displaying a prompt box on a user interface according to an embodiment of this application.

In some possible embodiments, after detecting an operation performed on the Hide operation item 4022 in the second area 402a (for example, a user finger (or a stylus or the like) triggers the Hide operation item 4022), in response to the operation, as shown in FIG. 4d, the electronic device 100 pops up a prompt box 403 on the user interface 400b. The prompt box 403 is used to prompt the user to further determine whether to hide the first album for which the Hide operation item 4022 is triggered. The prompt box 403 includes prompt information, an OK operation item and a Cancel operation item. The prompt information in FIG. 4d is "Whether to hide this first album". If the user triggers the OK operation item in the prompt box 403, the electronic device 100 hides the selected first album. If the user triggers the Cancel operation item in the prompt box 403, the selected first album is not hidden. In some other embodiments, the prompt box 403 may further include the following prompt information: If a user does not perform any operation when preset duration expires, it is considered by default that the user agrees to hide the selected first album. The preset duration may be 10 s, or may be 5 s, 15 s, or the like. It should be noted that the prompt box 403 may be referred to as a dialog box 403. This is not limited in this application.

Figure 4E:
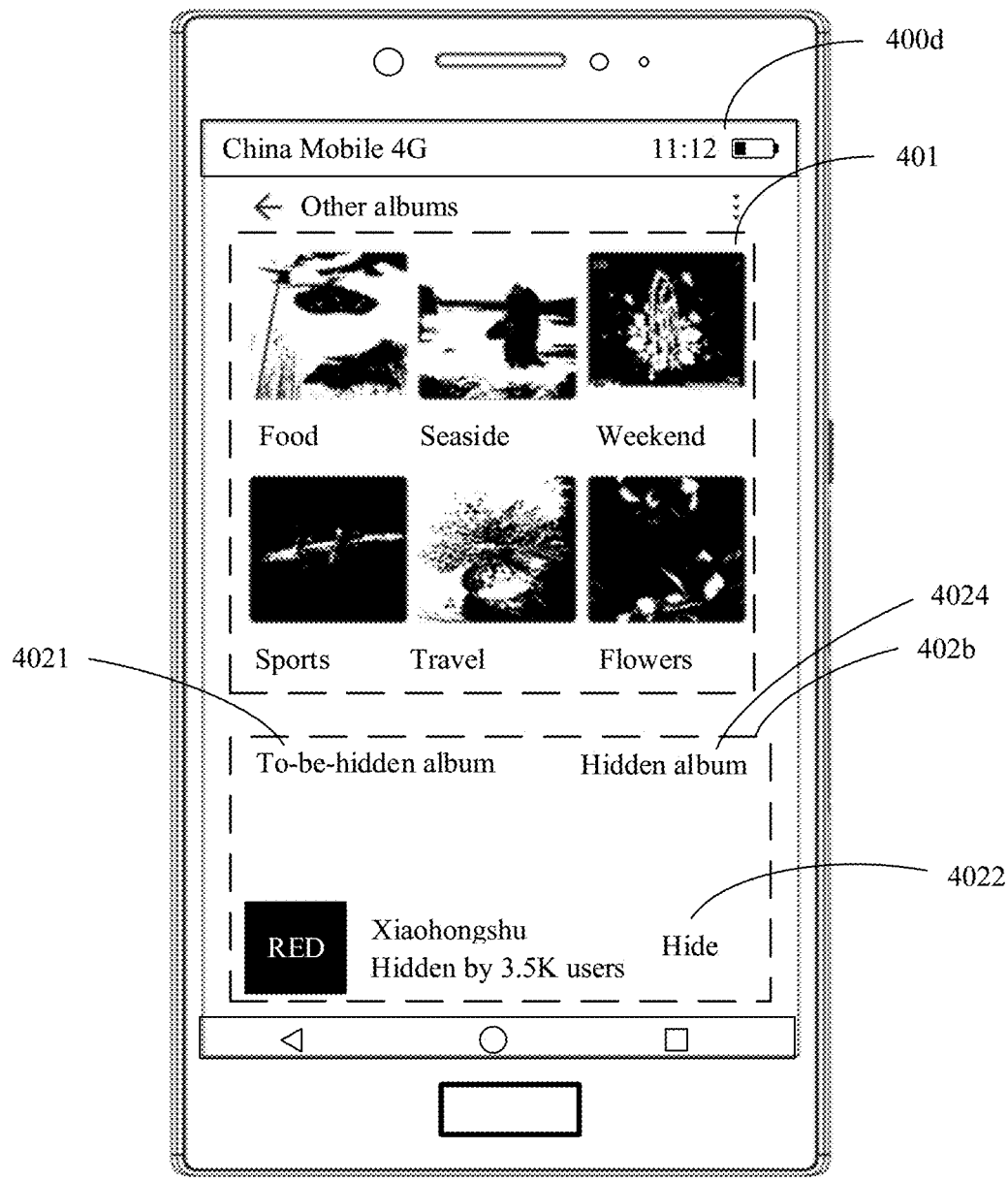
FIG. 4e is a schematic diagram of still another user interface of "Other albums" according to an embodiment of this application.
Figure 5A:
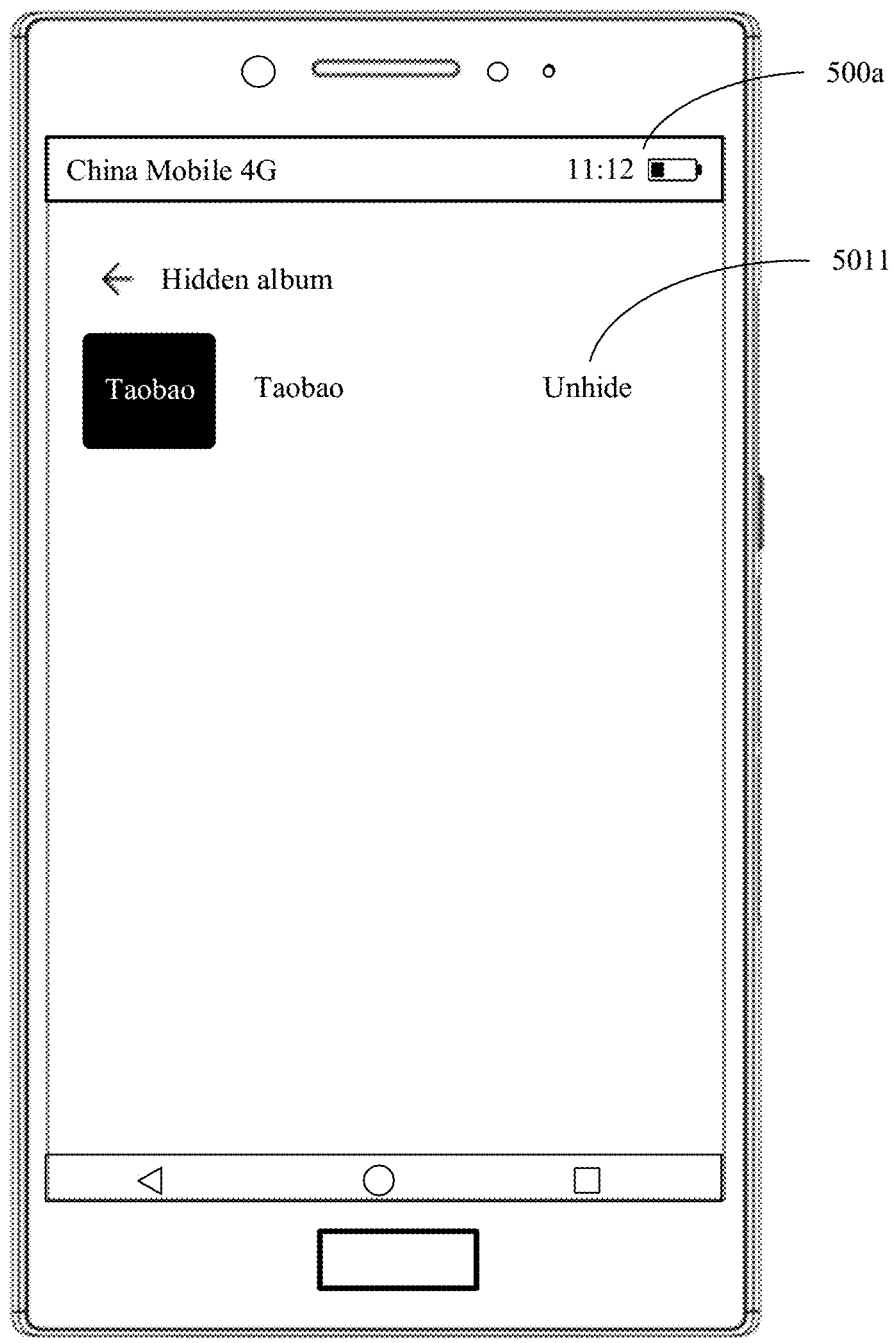
FIG. 5a is a schematic diagram of a user interface of "Hidden album" according to an embodiment of this application.

In some embodiments, in response to an operation performed on the OK operation item in the prompt box 403, the electronic device 100 displays still another user interface 400d (that is, a second user interface) of the "Other albums" on the touchscreen 150. As shown in FIG. 4e, the user interface 400d of the "Other albums" includes the To-be-hidden album operation item 4021, a Hidden album operation item 4024, the name of the first album, and the quantity of times the first album has been hidden by the user. A second area 402b in FIG. 4e hides "Taobao", a quantity of times "Taobao" has been hidden by a user, and the Hide operation item corresponding to "Taobao" that are in the second area 402a in FIG. 4d. That is, the second area 402b is obtained after the first album that is in the second area 402a and for which an operation is performed on the Hide operation item 4022 is hidden. The Hidden album operation item 4024 is used to query for a currently hidden album. The Hidden album operation item 4024 may be displayed in the second area 402b, and optionally, may be displayed on a right side of the To-be-hidden album operation item 4021. After detecting an operation performed on the Hidden album operation item 4024, in response to the operation, the electronic device 100 may display, on the touchscreen 150 of the electronic device 100, a user interface 500a (that is, a third user interface) that is of "Hidden album" and that is shown in FIG. 5a. The user interface 500a of "Hidden album" includes a name of a hidden album and an Unhide operation item 5011. The Unhide operation item 5011 is used to unhide a hidden album, that is, restore the hidden album. After the first album is hidden, the hidden album includes the first album. If only the first album is hidden, the hidden album is the first album. As shown in FIG. 5a, the name of the hidden album includes "Taobao".

In some embodiments, the Unhide operation item 5011 may be implemented in any one of the following manners:

displaying an "Unhide" button (as shown in FIG. 5a), displaying an "OFF" button, and displaying "Flick right or flick left". Whether "Flick right" or "Flick left" is displayed may be determined based on a flicking direction of the Hide operation item 4022. If the Hide operation item 4022 corresponds to "Flick right", the Unhide operation item 5011 corresponds to "Flick left"; or if the Hide operation item 4022 corresponds to "Flick left", the Unhide operation item 5011 corresponds to "Flick right". A specific implementation of the Unhide operation item 5011 is not limited in this application.

Figure 5B:
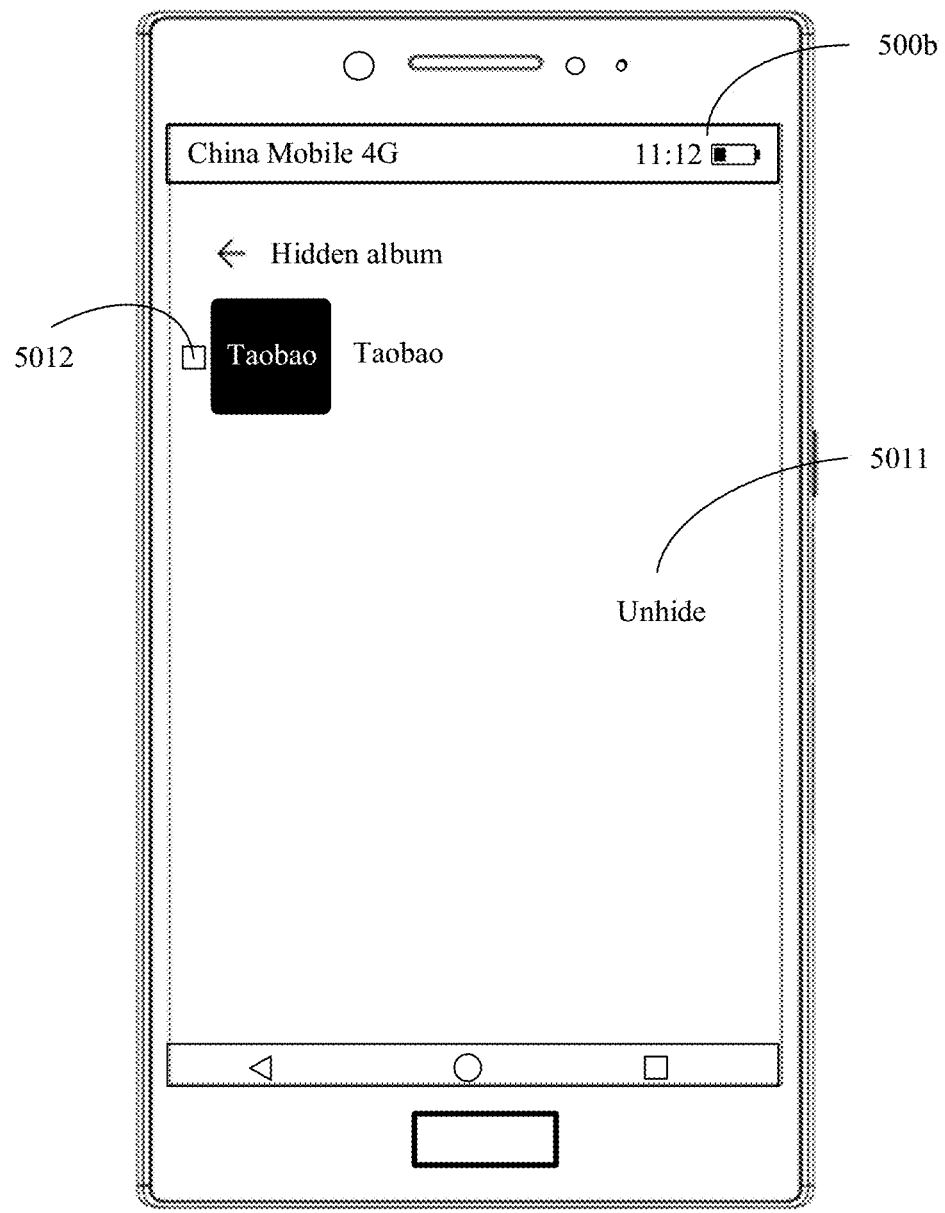
FIG. 5b is a schematic diagram of another user interface of "Hidden album" according to an embodiment of this application.

In a possible implementation, one Unhide operation item 5011 may be correspondingly set for a name of one hidden album. As shown in FIG. 5a, the Unhide operation item 5011 may be located on a right side of a name of a hidden album. In another possible implementation, after detecting an operation performed on the Hidden album operation item 4024 on the user interface 400d, in response to the operation, as shown in FIG. 5b, the electronic device 100 may alternatively display, on the touchscreen 150, a user interface 500b that is of "Hidden album" and that is shown in FIG. 5b. On the user interface 500b of "Hidden album", one Unhide operation item 5011 may be set for all hidden albums, and one select operation item 5012 is set in front of a name of each hidden album. If the electronic device 100 detects that an operation is performed on a select item 5012 in front of a hidden album, it indicates that an unhide operation is to be performed on the hidden album. Then, after detecting an operation performed on the Unhide operation item 5011, in response to the operation, the electronic device 100 may unhide the hidden album. For example, after detecting that an operation is performed on a select operation item 5012 in front of the "Taobao" album, and then detecting an operation performed on the Unhide operation item 5011, the electronic device 100 may unhide the "Taobao" album (a hidden album). If detecting that an operation is performed on select items 5012 in front of a plurality of hidden albums at a time, the electronic device 100 may determine that an unhide operation is to be performed on the plurality of hidden albums at a time. Then, after detecting an operation performed on the Unhide operation item 5011, in response to the operation, the electronic device 100 may unhide the plurality of hidden albums at a time. In this way, it helps improve efficiency of an unhide operation. For example, after detecting that an operation is performed on both select operation items 5012 in front of the "Taobao" album and the "Xiaohongshu" album, and then detecting an operation performed on the Unhide operation item 5011, the electronic device 100 may unhide the "Taobao" album and the "Xiaohongshu" album.

After detecting an operation performed on the Unhide operation item 5011, in response to the operation item, the electronic device 100 may display, on the touchscreen 150, a user interface 300 (that is, a fourth user interface, where the fourth user interface may be the same as the first user interface) shown in FIG. 4a. It may also be understood as that after the Unhide operation item 5011 is triggered, a user interface existing before hiding is triggered may be restored.

In some embodiments, when a user interface displayed on the touchscreen 150 of the electronic device 100 changes from FIG. 4a (or FIG. 4b) to FIG. 4e, content of a first folder stored in the memory 102 in the electronic device 100 also changes accordingly. An example is used for description in which an Android Android system is installed on the electronic device 100. In the Android system, a media database (for example, a SQLite database) is established for multimedia files (multimedia files such as a picture, audio, and a video). It may also be understood as that the media database stores multimedia files such as a picture, a video, and audio for use by a video player, a music player, a gallery, or the like. In the Android system, a process named "Media" automatically runs. The "Media" process automatically scans all files in the memory 102 in the electronic device 100, and automatically adds a media file such as a picture, music, or a video among the files to a system-related media list, for example, listing the media file in a gallery. It may also be understood as that a mechanism of the gallery is displaying the first folder in the memory 102 in the electronic device 100 after scanning the first folder. Assuming that a picture is stored in the first folder in the memory 102 in the electronic device 100, the "Media" process scans the picture and then lists the picture in the gallery.

In the following embodiment, an example is used for description in which a to-be-hidden album is a "Taobao" album.

Figure 6A:
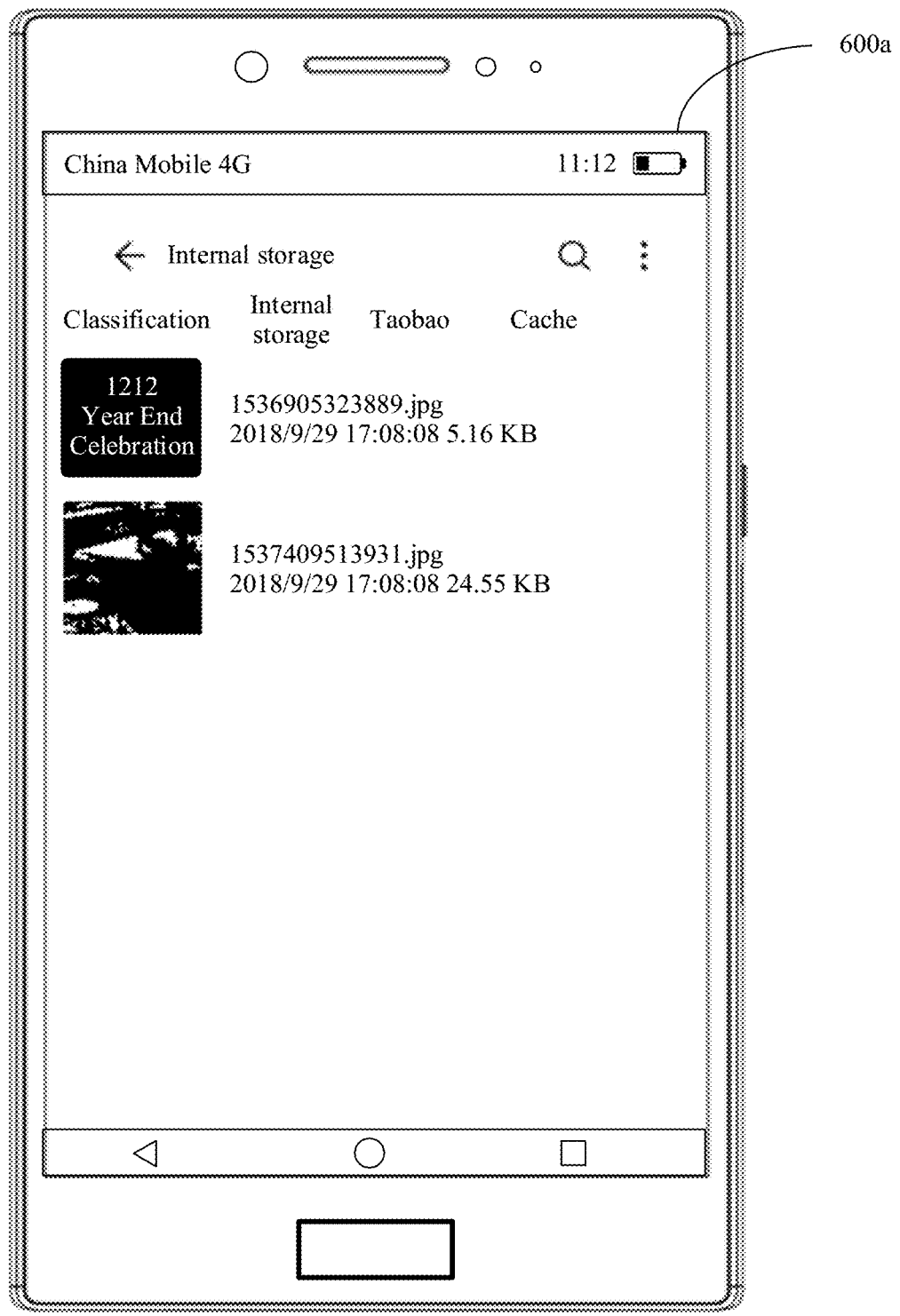
FIG. 6a is a schematic diagram of a display interface that is of a cache folder of "Taobao" and that exists before a "Taobao" album is hidden according to an embodiment of this application.

FIG. 6a shows an example of a display interface that is of a first folder of "Taobao" and that exists before a "Taobao" album is hidden. The first folder of "Taobao" is a cache folder (cache) of "Taobao". The following uses an example in which the first folder is the cache folder of "Taobao" for description. A cached picture generated by "Taobao" is cached in the cache folder of "Taobao". The cached pictures generated by "Taobao" form a first album. It may also be understood as that the first album of "Taobao" is stored in the cache folder of "Taobao". Based on the user interface 400a in FIG. 4a, content in the cache folder of "Taobao" is shown in FIG. 6a. It may also be understood as that when the user interface 400a shown in FIG. 4a is displayed on the touchscreen 150 in the electronic device 100, the cache folder of "Taobao" in the memory 102 in the electronic device 100 stores content shown in FIG. 6a. As shown in FIG. 6a, the cache folder of "Taobao" is stored in an internal storage in the electronic device, where the internal storage is also represented by "storage/emulated/0/". The cache folder of "Taobao" includes two pictures cached by "Taobao", and paths of the pictures are: internal storage/taobao/cache/1536905323889.jpg and internal storage/taobao/cache/1537409513931.jpg, where "taobao" is a name of an application that generates the cached pictures; "cache" is a folder used by the application "Taobao" for caching data, that is, the cache folder; and 1536905323889.jpg and 1537409513931.jpg are the pictures cached by "Taobao", and are cached in the cache folder of "Taobao". 1536905323889.jpg and 1537409513931.jpg form the first album. It may also be understood as that the first folder includes the first album. When the process named "Media" in the Android system automatically runs, the "Media" process automatically scans the two pictures and displays the two pictures in the album named "Taobao" in the gallery.

Based on the cache folder of "Taobao" shown in FIG. 6a, Table 1 shows a media type of media data that is in the media database before the "Taobao" album is hidden.

TABLE 1

| Media type of media data that is in a media database before a "Taobao" album is hidden | | | |
|---|---|---|---|
| Media type (media_type) | Data (data) | Internet media type (mime_type) | Directory (title) |
| 0 | /storage/emulated/0/taobao | (null) | cache |
| 1 | /storage/emulated/0/taobao | image/jpeg | 1536805323889 |
| 1 | /storage/emulated/0/taobao | image/jpeg | 1537409513931 |

In some embodiments, the media type (media_type) includes a picture type or a video type, where the picture type may be represented by 1, and the video type may be represented by 3. Types that are not the picture type, the video type, or an audio type may be collectively referred to as a non-media file type, which is represented by 0 and may be identified by a suffix such as .docx or .txt. In Table 1, before the "Taobao" album is hidden, both media types of the two pictures cached by "Taobao" in the media database are the picture type, may be represented by 1, and may be specifically identified by a suffix such as .gif, .jpeg, or .image. "/storage/emulated/0/" is used to indicate the internal storage in a storage path.

Figure 6B:
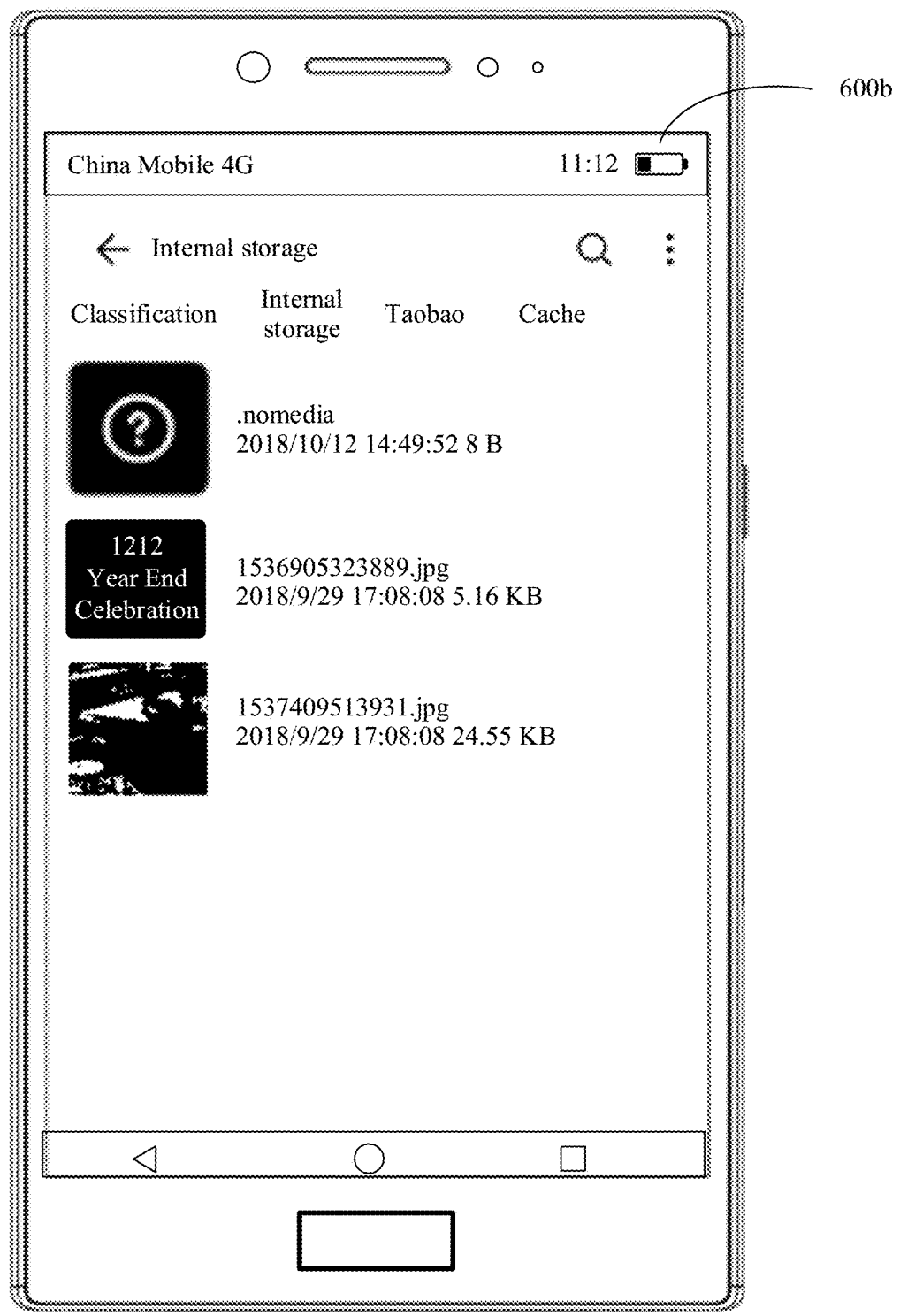
FIG. 6b is a schematic diagram of a display interface that is of a cache folder of "Taobao" and that exists after a "Taobao" album is hidden according to an embodiment of this application.

After the electronic device detects an operation performed on the Hide operation item 4022 that corresponds to "Taobao" and that is on the first user interface (that is, FIG. 4a), the electronic device adds a first file to the first folder, and changes a media type of a picture in the first folder to a non-media file type. The first file is used to enable the electronic device to skip scanning the picture in the first folder. It may also be understood as that the first file is added to the cache folder of "Taobao", and the media types of 1536905323889.jpg and 1537409513931.jpg in the cache folder of "Taobao" are changed to the non-media file type, that is, 1 is changed to 0. That the first file can enable the electronic device to skip scanning 1536905323889.jpg and 1537409513931.jpg in the cache folder of "Taobao" may be understood as that the first file enables the "Media" process to skip scanning 1536905323889.jpg and 1537409513931.jpg in the cache folder of "Taobao", or may be understood as that "Media" skips scanning the cache folder of "Taobao". Optionally, the first file may be a ".nomedia" file (folder). FIG. 6b shows an example of a display interface that is of a first folder and that exists after a "Taobao" album is hidden. The following uses an example in which the first folder is a cache folder of "Taobao" for description. A display interface 600b of the cache folder of "Taobao" corresponds to the second user interface shown in FIG. 4e. It may also be understood as that when the user interface 400d shown in FIG. 4e is displayed on the touchscreen 150 in the electronic device 100, the cache folder of "Taobao" in the memory 102 in the electronic device 100 stores content shown in FIG. 6b. As shown in FIG. 6b, the cache folder of "Taobao" is stored in an internal storage in the electronic device. The cache folder of "Taobao" currently includes two pictures cached by "Taobao" and a newly added ".nomedia" file (folder). When FIG. 6b is compared with FIG. 6a that exists before the hiding, media types of 1536905323889.jpg and 1537409513931.jpg are changed to 0. Content of the ".nomedia" file (folder) may be null. Because the media types of 1536905323889.jpg and 1537409513931.jpg are changed to 0, the two pictures are no longer displayed on a user interface when a subsequent user interface display notification is received. Further, because the ".nomedia" file (folder) is added to the cache folder of "Taobao", the "Media" process in the Android system skips scanning the cache folder of "Taobao". Therefore, a media file such as a picture in the cache folder of "Taobao" is not scanned during scanning performed by the "Media" process, and is not displayed in an application such as a gallery, either. In addition, because there is the ".nomedia" file (folder) in the cache folder of "Taobao", any media file subsequently cached in the cache folder of "Taobao", such as a picture, a video, or audio, is no longer scanned by the "Media" process. That is, the media file in the cache file of "Taobao" is no longer displayed in an application such as the gallery.

Correspondingly, based on the cache file of "Taobao" shown in FIG. 6b, Table 2 shows a media type of media data that is in the media database after the "Taobao" album is hidden.

TABLE 2

| Media type of media data that is in a media database after a "Taobao" album is hidden | | | |
|---|---|---|---|
| Media type (media_type) | Data (data) | Internet media type (mine_type) | Directory (title) |
| 0 | /storage/emulated/0/taobao | (null) | cache |
| 0 | /storage/emulated/0/taobao | image/jpeg | 1536805323889 |
| 0 | /storage/emulated/0/taobao | image/jpeg | 1537409513931 |
| 0 | /storage/emulated/0/taobao | (null) | .nomedia |

As shown in Table 2, after the cache album of "Taobao" is hidden, both the media types of the two pictures cached by "Taobao" in the media database are changed to a non-media file type, that is, both the media types are represented by 0. It may also be understood as that after the first album in the cache file of "Taobao" is hidden, the pictures in the cache file of "Taobao" are recorded as non-media files, and further the "Media" process no longer scans the two pictures. Therefore, the two pictures are not displayed in the gallery, either. "/storage/emulated/0/" is also used to indicate the internal storage in a storage path.

In some embodiments, after the electronic device 100 detects that the "Taobao" album is unhidden, the electronic device 100 may delete the added ".nomedia" file (folder) in FIG. 6b, and change the media types of the pictures that are cached by "Taobao" and recorded in the media database to 1. In this way, the pictures in the cache folder of "Taobao" may be re-listed in the gallery in a form of the first album, and may be displayed on the user interface shown in FIG. 4a.

Figure 7:
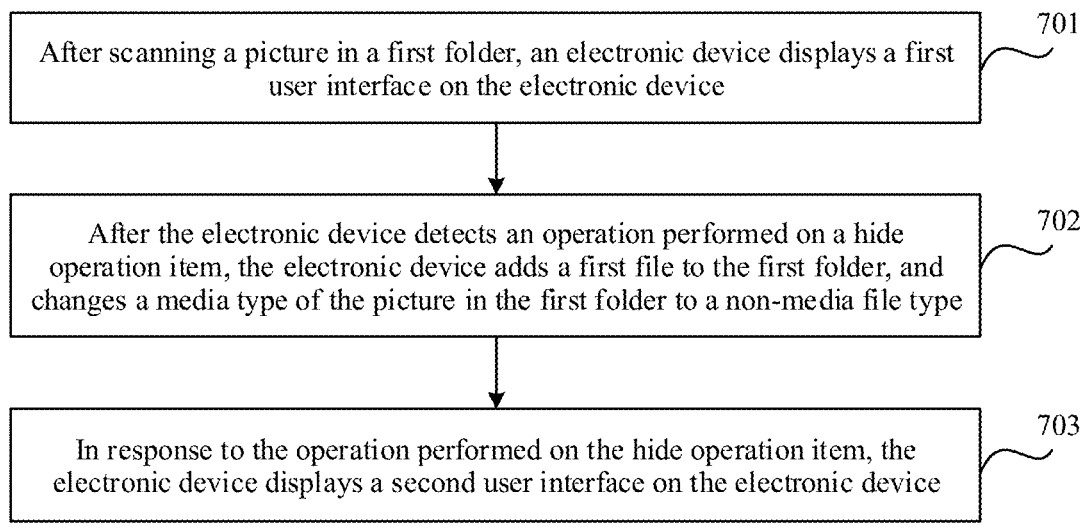
FIG. 7 is a schematic flowchart of an album hiding method according to an embodiment of this application.

Based on the foregoing content, FIG. 7 shows an album display method according to this application. The album display method includes the following steps.

Step 701: After scanning a picture in a first folder, an electronic device displays a first user interface on the electronic device, where the first user interface includes a first album that includes the picture in the first folder, a quantity of times the first album has been hidden by a user, and a hide operation item.

Herein, the hide operation item is used to hide the first album. The first album is a to-be-hidden album.

Regarding that which albums are used as to-be-hidden albums, the electronic device may obtain a set of suspected to-be-hidden albums, which may also be referred to as a list of suspected to-be-hidden albums, and determine a to-be-hidden album in the electronic device based on the suspected to-be-hidden albums on the list of suspected to-be-hidden albums and an album locally existing in the electronic device. That is, the electronic device determines the first album, marks the first album as the to-be-hidden album, and may display a user interface shown in FIG. 4a. The list of suspected to-be-hidden albums includes at least the first album.

This application provides an implementation of obtaining the list of suspected to-be-hidden albums by the electronic device. In a possible implementation, the list of suspected to-be-hidden albums may be determined in a manner of manual statistics collection, the obtained list of suspected to-be-hidden albums may be stored in a server, and the electronic device may obtain the list of suspected to-be-hidden albums from the server. The server may be a Huawei cloud server. The list of suspected to-be-hidden albums includes at least one suspected to-be-hidden album. The electronic device may obtain the list of suspected to-be-hidden albums from the server in two manners shown in FIG. 8a and FIG. 8b.

In an implementation 1, the server proactively pushes the stored list of suspected to-be-hidden albums to the electronic device. Optionally, the list of suspected to-be-hidden albums is constantly updated, and the server may proactively push a latest list of suspected to-be-hidden albums to the electronic device periodically or after each update is performed. A frequency at which the server proactively pushes the list to the electronic device may be preset, or may be adaptively adjusted based on an actual requirement.

In an implementation 2, the electronic device proactively obtains, from the server, a latest list of suspected to-be-hidden albums stored in the server. Optionally, the electronic device may proactively obtain the list of suspected to-be-hidden albums from the server periodically.

Figure 8A:
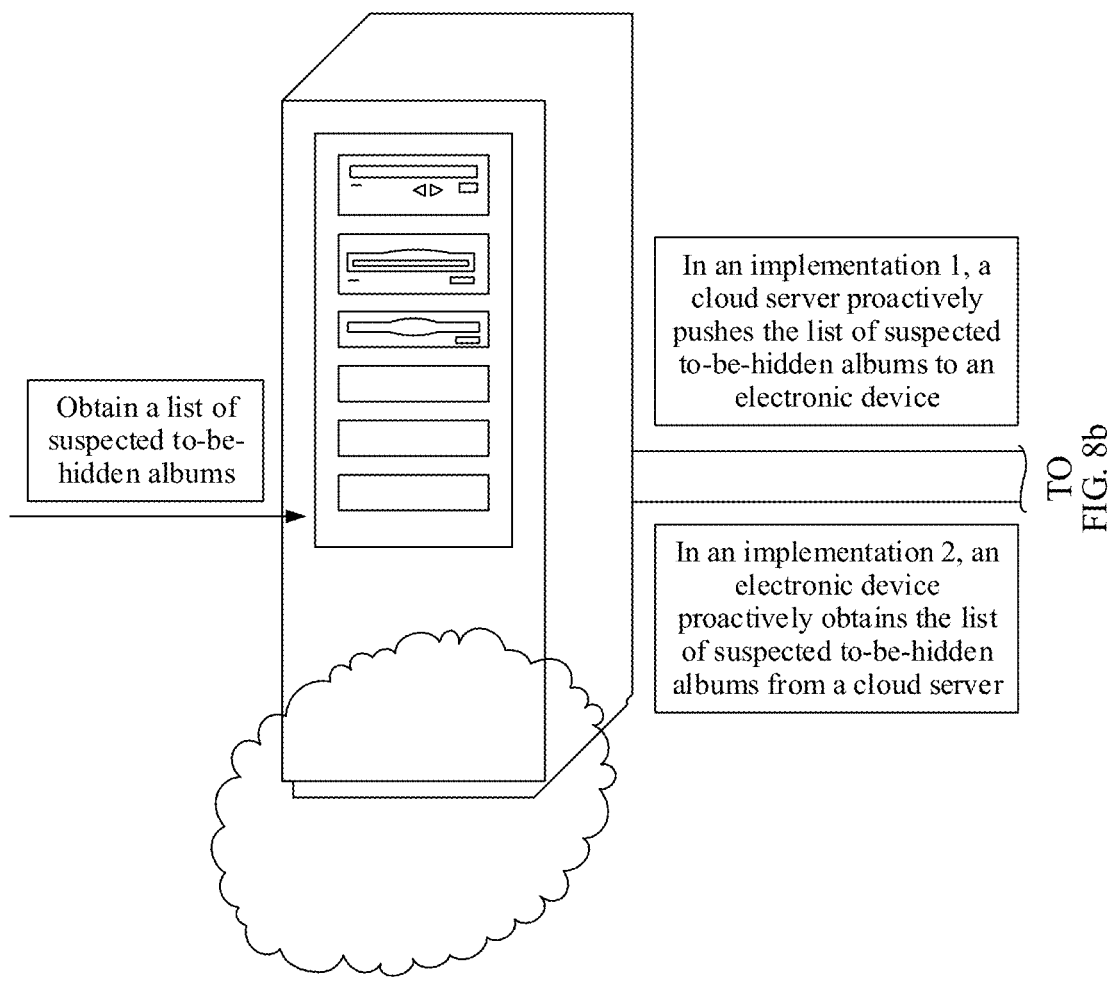
FIG. 8a and FIG. 8b are a schematic diagram of a process in which an electronic device obtains a suspected cache album according to an embodiment of this application.
Figure 8B:
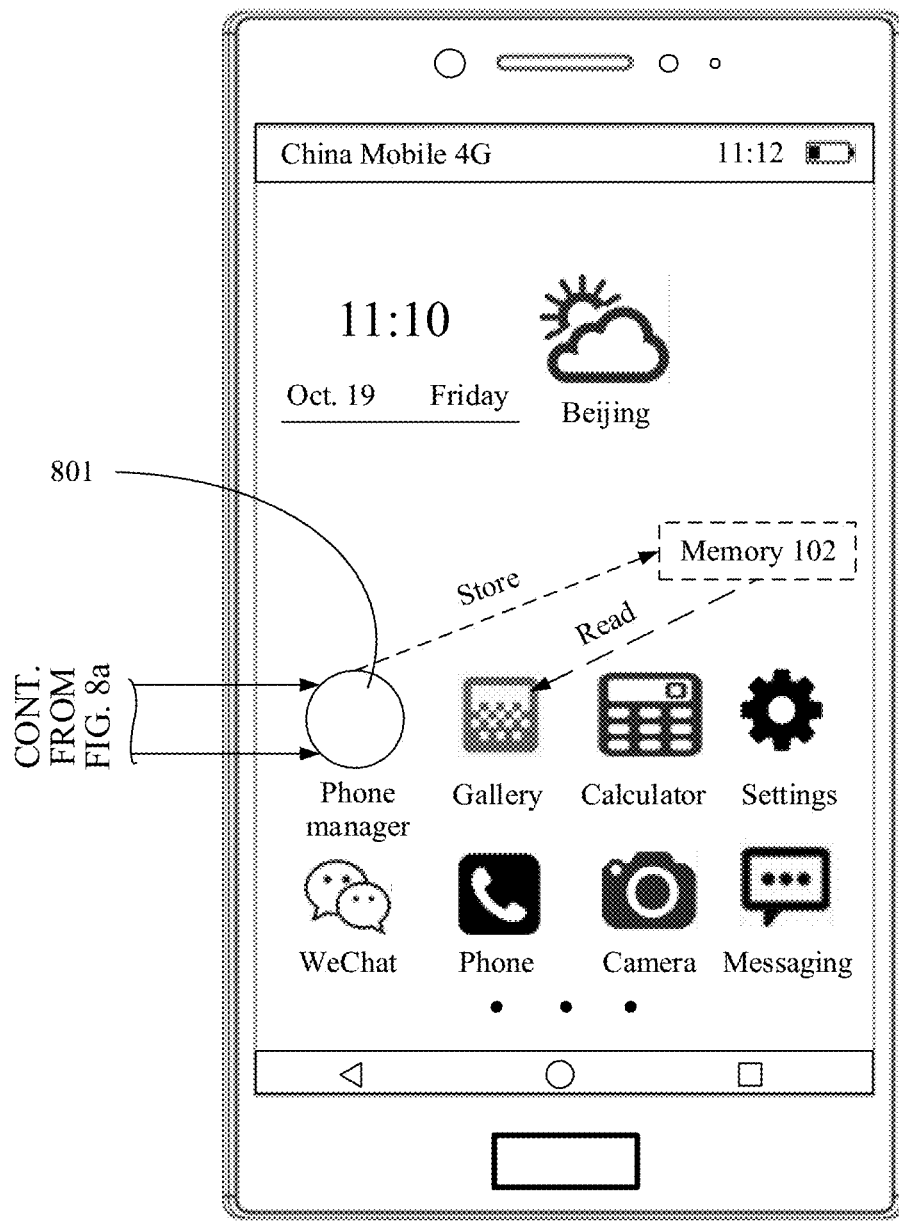

In specific implementation, a phone manager or a 360 manager may be installed on the electronic device. In FIG. 8a and FIG. 8b, a phone manager 801 is used as an example. The electronic device may receive, by using the phone manager 801, the list of suspected to-be-hidden albums pushed by the server, or the electronic device may proactively obtain, from the server by using the phone manager 801, the list of suspected to-be-hidden albums stored in the server. Then, the electronic device stores, in a memory 102 in the electronic device, the list of suspected to-be-hidden albums obtained by the phone manager 801.

In a possible implementation, a storage format of the list of suspected to-be-hidden albums may be an XML format. The following shows the storage format of the list of suspected to-be-hidden albums by using "Taobao" as an example.

```
<entry>
    <cache_dir>/taobaoDownloads/picview_tmp</cache_dir>
    <app_name>Taobao</app_name>
</entry>
```

In the storage format, "<entry>" indicates an entry, "<cache_dir>" indicates that a cache folder established by the "Taobao" application is started, "taobaoDownloads/picview_tmp" indicates a cache path, and "<app_name>Taobao</app_name>" indicates that an application name is "Taobao".

With reference to FIG. 2, in a possible implementation, when a user triggers an icon of a Gallery 204 on a home screen 200 displayed on a touchscreen 150, the Gallery may read the list of suspected to-be-hidden albums from the memory 102 in the electronic device, and determine the first album based on the list of suspected to-be-hidden albums and an album in the Gallery in the electronic device. Specifically, the electronic device may match the album in the Gallery with the list of suspected to-be-hidden albums; determine an identified album in the Gallery as the first album; and mark the album as a to-be-hidden album. For example, if the list of suspected to-be-hidden albums includes "Taobao" and "Xiaohongshu", and the Gallery also includes a "Taobao" album and a "Xiaohongshu" album, the electronic device may determine both the "Taobao" album and the "Xiaohongshu" album as the first albums, mark both the "Taobao" album and the "Xiaohongshu" album as to-be-hidden albums, and display the "Taobao" album and the "Xiaohongshu" album on a user interface, as shown in FIG. 4a. If the list of suspected to-be-hidden albums further includes "UC browser" but there is no "UC browser" album in the Gallery, the electronic device may ignore the UC browser on the list of suspected to-be-hidden albums.

Step 702: After the electronic device detects an operation performed on the hide operation item, the electronic device adds a first file to the first folder, and changes a media type of the picture in the first folder to a non-media file type, where the first file is used to enable the electronic device to skip scanning the picture in the first folder.

Herein, the first folder may be a cache folder of an application, for example, may be a cache folder of "Taobao" or a cache folder of "Xiaohongshu". The first file may be a .nomedia file.

A file type includes a media type and a non-media file type. The media type may include a picture type, an audio type, and a video type. Other file types other than the picture type, the audio type, and the video type may be collectively referred to as the non-media file type.

In a possible implementation, the electronic device needs to also delete all pictures in the first album stored in a gallery database.

Step 703: In response to the operation performed on the hide operation item, the electronic device displays a second user interface on the electronic device, where the second user interface is an interface obtained after the first album on the first user interface is hidden.

With reference to FIG. 4a and FIG. 4e, after detecting an operation performed on the Hide operation item 4022 on the first user interface 400a, in response to the operation, the electronic device 100 displays the second user interface 400d on the touchscreen 150 of the electronic device 100. That is, on the second user interface 400d, "Taobao", a quantity of times the "Taobao" album has been hidden by a user, and a hide operation item corresponding to "Taobao" that are in the second area 402a are hidden.

It can be learned from step 701 to step 703 that the first user interface displayed on the electronic device includes a current quantity of times the first album has been hidden by a user. In this way, a current status of that the first album is hidden can be quantified, thereby helping a user determine, with reference to the quantity of times the first album has been hidden by the user, whether to hide the first album. In addition, by hiding the first album, it can be implemented that the hidden first album is no longer displayed in the Gallery, thereby facilitating the user's search for a desired album in the Gallery.

Further, after the first file is added to the first folder, the electronic device can be enabled to skip scanning the picture in the first folder, that is, a "Media" process skips scanning the picture in the first folder. Therefore, the picture in the first folder is not displayed in an application such as the Gallery. In addition, because the first file is newly added to the first folder, even if another picture is subsequently added (or a new cached picture is cached) to the first folder, the another picture is no longer displayed in an application such as the Gallery.

Figure 9:
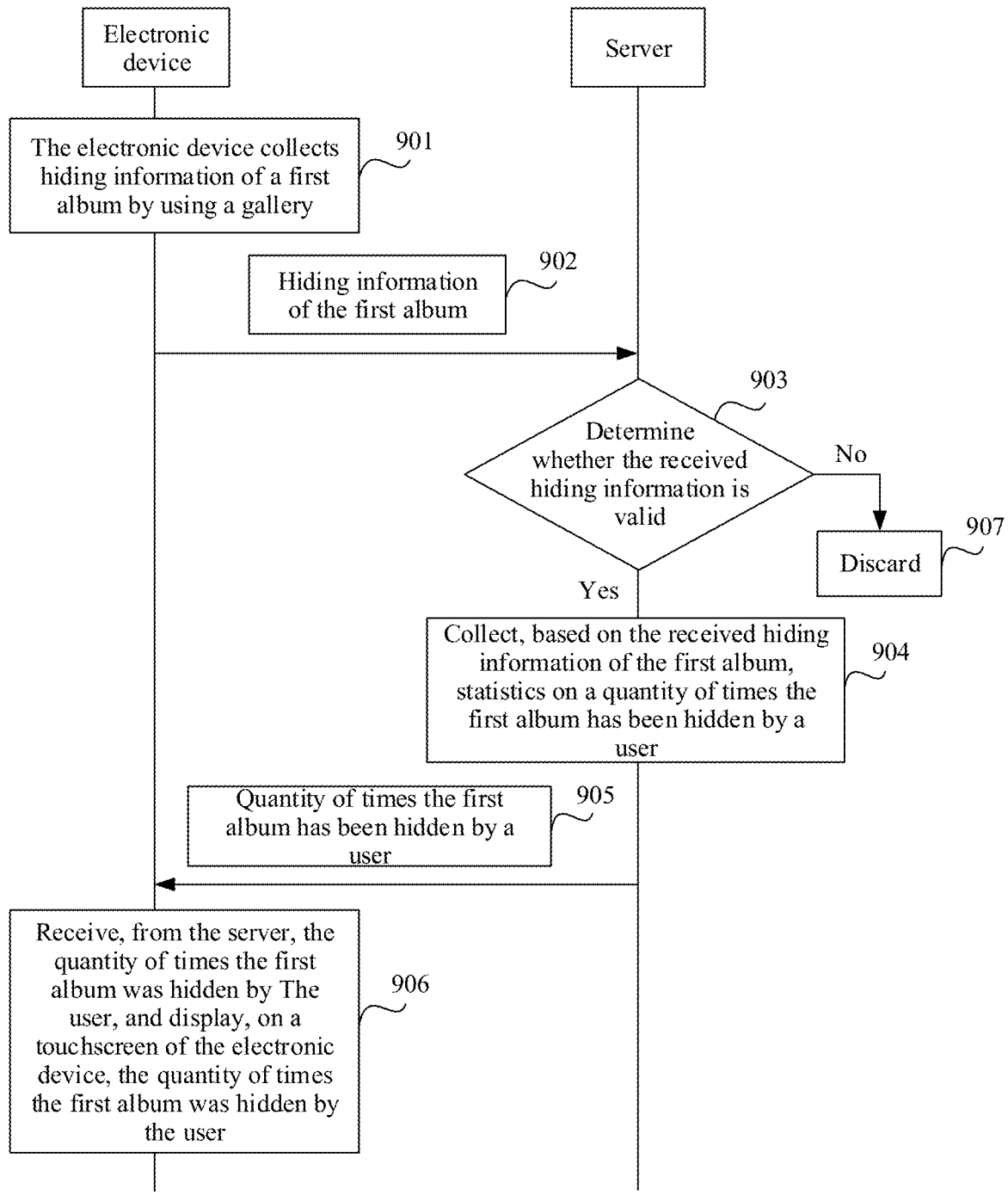
FIG. 9 is a schematic flowchart of a method for obtaining a quantity of times a hidden album has been hidden by a user according to an embodiment of this application.

In step 701, the electronic device may obtain, by using the server, the quantity of times the first album has been hidden by the user. The electronic device 100 may obtain, by using a method shown in FIG. 9, the quantity of times the first album has been hidden by the user. FIG. 9 is a schematic flowchart of a method for obtaining a quantity of times a first album has been hidden by a user according to this application. As shown in FIG. 9, the method includes the following steps.

Step 901: An electronic device collects hiding information of a first album by using a gallery.

The hiding information of the first album may be a path of the first album. The first album can be uniquely determined based on the path of the first album, and an application that generates the first album, and a cache file of the application can be accurately determined based on the path of the first album. In a possible implementation, the path of the first album may be "internal storage/application name/folder/directory". A "Taobao" application is used as an example. A path of a picture cached by "Taobao" may be: internal storage/taobao/cache/1537409513931.jpg, where the application name is "taobao", the folder is "cache", and the directory is "1537409513931.jpg".

Step 902: The electronic device sends the hiding information of the first album to a server.

In a possible implementation, a format of the hiding information may be "path/hide". To prevent user information leakage, the path may be encrypted. For example, a hash operation may be performed on the path to obtain a hash value about the path. Correspondingly, the format of the hiding information is "hash value corresponding to the path/hide".

In some embodiments, because communication between the server and the electronic device is restricted by a network bandwidth, the electronic device may first store the collected hiding information of the first album locally in the electronic device, and then send the hiding information to the server at a preset time.

Step 903: The server determines whether the received hiding information is valid; and if the received hiding information is valid, the server performs step 904, or if the received hiding information is invalid, the server performs step 907.

In a possible implementation, the server may detect whether the format of the hiding information is correct, that is, the server detects whether the format of the hiding information is the "path/hide" format. If the format of the hiding information is the "path/hide" format, it indicates that the received hiding information is valid, and the subsequent step 904 is performed; or if the format of the hiding information is not the "path/hide" format, it indicates that the received hiding information is invalid, and the received hiding information is discarded.

Step 904: The server collects, based on the received hiding information of the first album, statistics on a quantity of times the first album has been hidden by a user.

In a possible implementation, the server may store, in a form of a table, the collected quantity of times the first album has been hidden by the user. Table 3 shows a quantity of times, stored in the server, that a first album has been hidden by a user according to this application.

TABLE 3

Quantity of times, stored in a server, that a first album has been hidden by a user

| First album | Quantity of times the first album has been hidden by a user |
| --- | --- |
| "Taobao" | 5k |
| "Xiaohongshu" | 3.5k |

In Table 3, "Taobao" may be represented by a first hash value, and "Xiaohongshu" may be represented by a second hash value. The first hash value is a hash value obtained after a hash operation is performed on a path of a "Taobao" album, and the second hash value is a hash value obtained after a hash operation is performed on a path of a "Xiaohongshu" album.

Step 905: The server pushes, to the electronic device, the quantity of times the first album has been hidden by the user.

In a possible implementation, the server may push, to the electronic device, the locally stored latest quantity of times the first album has been hidden by a user, and the server may push the quantity to the electronic device in a form of Table 3.

Step 906: The electronic device receives, from the server, the quantity of times the first album has been hidden by the user, and displays, on a touchscreen of the electronic device, the quantity of times the first album has been hidden by the user.

In a possible implementation, the server pushes, to the electronic device, the quantity of times the first album has been hidden by the user shown in Table 3. After receiving the quantity of times the first album has been hidden by the user, which is pushed by the server and shown in Table 3, the electronic device may display the user interface 400a shown in FIG. 4a.

To enable the electronic device to locally store real historical data, in a possible implementation, after receiving the quantity of times, pushed by the server, the first album has been hidden by the user, the electronic device locally caches the quantity of times the first album has been hidden by the user. That is, the electronic device may establish a local caching management mechanism, to cache the received quantity of times the first album has been hidden by the user.

Step 907: Discard the received hiding information.

It should be understood that the embodiments of this application may be used in combination with each other, or may be used individually.

In the foregoing embodiments provided in this application, the method provided in the embodiments of this application is described from a perspective that an electronic device works as an execution body. To implement functions in the method provided in the foregoing embodiments of this application, the electronic device may include a hardware structure and/or a software module, and implement the foregoing functions in a form of the hardware structure, the software module, or a combination of the hardware structure and the software module. Whether a specific function among the foregoing functions is performed in a manner of the hardware structure, the software module, or a combination of the hardware structure and the software module depends on particular applications and design constraints of the technical solutions.

Figure 10:
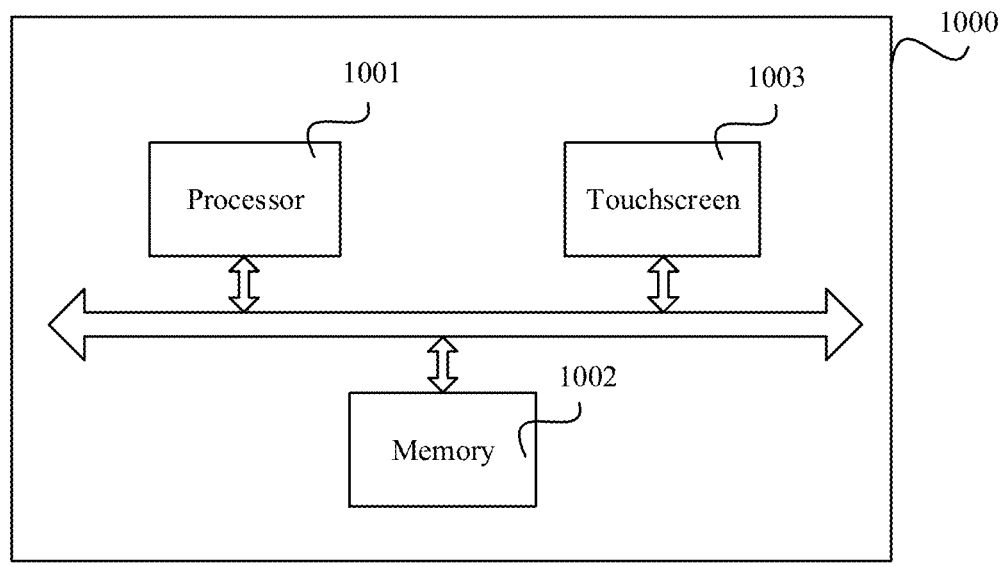
FIG. 10 is a schematic structural diagram of an electronic device according to an embodiment of this application.

Based on the foregoing content and a same concept, FIG. 10 shows an electronic device 1000 according to this application. For example, the electronic device 1000 includes at least one processor 1001, a memory 1002, and a touchscreen 1003. The processor 1001 is separately coupled to the memory 1002 and the touchscreen 1003. The coupling in this embodiment of this application may be a communication connection, may be in an electrical form or another form.

Specifically, the memory 1002 is configured to store one or more computer programs and a picture in a first folder.

The touchscreen 1003 is configured to display a user interface.

The processor 1001 is configured to invoke one or more computer programs stored in the memory 1002, so that the electronic device 1000 is enabled to perform the steps performed by an electronic device in the album display method provided in embodiments of this application. It should be understood that the electronic device 1000 may be configured to implement the album display method in the embodiments of this application. For related features, refer to the foregoing descriptions. Details are not described herein.

Figure 11:
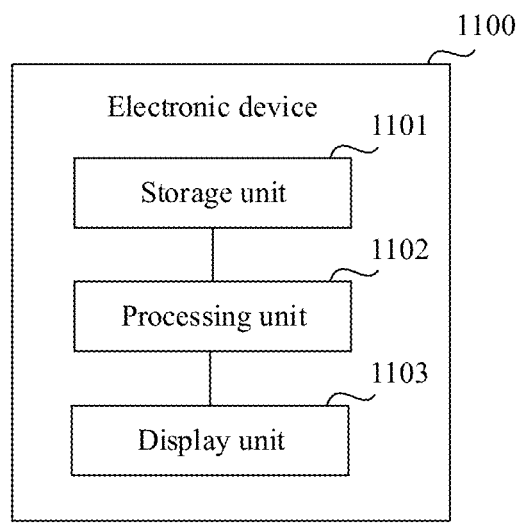
FIG. 11 is a schematic structural diagram of an electronic device according to an embodiment of this application.

Based on the foregoing content and a same concept, this application provides an electronic device 1100, configured to perform the foregoing method. FIG. 11 is an example of a schematic structural diagram of an electronic device according to this application. As shown in FIG. 11, the electronic device 1100 includes a processing unit 1101, a storage unit 1102, and a display unit 1103.

The storage unit 1102 is configured to store one or more computer programs and a picture in a first folder.

The display unit 1103 is configured to display a user interface.

The processing unit 1101 is configured to invoke one or more computer programs stored in the storage unit 1102, so that the electronic device 1100 is enabled to perform the steps performed by an electronic device in the album display method provided in embodiments of this application. It should be understood that the electronic device 1100 may be configured to implement the album display method in the embodiment of this application. For related features, refer to the foregoing descriptions. Details are not described herein.

It should be understood that division into the foregoing units of the electronic device is merely logical function division. In actual implementation, all or some units may be integrated into one physical entity, or may be physically separated. In this embodiment of this application, the processing unit 1101 in FIG. 11 may be implemented by the processor 1001 in FIG. 10, the storage unit 1102 may be implemented by the memory 1002 in FIG. 10, and the display unit 1103 may be implemented by the touchscreen 1003 in FIG. 10. In other words, in this embodiment of this application, the processing unit 1101 may perform the solution performed by the processor 1001 in FIG. 10, and the display unit 1103 may perform the solution performed by the touchscreen 1003 in FIG. 10. For other content, refer to the foregoing content. Details are not described herein again.

A person skilled in the art may clearly understand that the embodiments of this application may be implemented by hardware, or by hardware and software. When it is implemented by using hardware and software, the foregoing functions may be stored in a computer-readable medium.

In summary, what is described above is merely embodiments of this application, but is not intended to limit the protection scope of this application. Any modification, equivalent replacement, or improvement made according to the disclosure of this application shall fall within the protection scope of this application.

What is claimed is:

1. An album display method, comprising:
   after scanning a picture in a first folder, displaying, by an electronic device, a first user interface on the electronic device, wherein the first user interface comprises a first album that comprises the picture in the first folder, a quantity of times the first album has been hidden, and a hide operation item, wherein the hide operation item is used to hide the first album and the quantity of times which the first album has been hidden is from a server;
   after detecting an operation performed on the hide operation item, adding, by the electronic device, a first file to the first folder, and changing a media type of the picture in the first folder to a non-media file type, wherein the first file is used to enable the electronic device to skip scanning the picture in the first folder; and
   in response to the operation performed on the hide operation item, displaying, by the electronic device, a second user interface on the electronic device, wherein the second user interface is an interface obtained after the first album on the first user interface is hidden,
   wherein the first folder is a cache folder,
   wherein the first file is a nomedia file,
   wherein the displaying by an electronic device, a first user interface on the electronic device comprises:
   obtaining, by the electronic device, a set of suspected to-be-hidden albums proactively pushed by the server, and
   determining, by the electronic device, that the first album is a to-be-hidden album.

2. The method according to claim 1, wherein the second user interface further comprises:
   a hidden album operation item;
   after detecting an operation performed on the hidden album operation item, displaying, by the electronic device, a third user interface; and
   the third user interface comprises the first album and an unhide operation item, wherein the unhide operation item is used to unhide the first album.

3. The method according to claim 2, wherein the method further comprises:
   after detecting an operation performed on the unhide operation item on the third user interface, deleting, by the electronic device, the first file in the first folder, and changing the media type of the picture in the first folder to a picture type; and in response to the operation performed on the unhide operation item, displaying, by the electronic device, a fourth user interface on the electronic device, wherein the fourth user interface comprises the first album.

4. An electronic device, comprising:
a non-transitory memory, configured to store one or more computer programs and a picture in a first folder;
a touchscreen, configured to, in coordination with a processor: after scanning the picture in the first folder, display a first user interface on an electronic device, wherein the first user interface comprises a first album that comprises the picture in the first folder, a quantity of times the first album has been hidden, and a hide operation item, wherein the hide operation item is used to hide the first album and the quantity of times which the first album has been hidden is from a server; and in response to an operation performed on the hide operation item, display a second user interface on the electronic device, wherein the second user interface is an interface obtained after the first album on the first user interface is hidden; and
the processor, configured to: after detecting the operation performed on the hide operation item, add a first file to the first folder, and change a media type of the picture in the first folder to a non-media file type, wherein the first file is used to enable the electronic device to skip scanning the picture in the first folder,
wherein the first folder is a cache folder,
wherein the first file is a nomedia file,
wherein the displaying a first user interface on the electronic device comprises:
obtaining a set of suspected to-be-hidden albums proactively pushed by the server, and determining that the first album is a to-be-hidden album.

5. The electronic device according to claim 4, wherein the second user interface further comprises a hidden album operation item; and
the touchscreen is further configured to, in coordination with a processor:
after detecting an operation performed on the hidden album operation item, display a third user interface, wherein the third user interface comprises the first album and an unhide operation item, and the unhide operation item is used to unhide the first album.

6. The electronic device according to claim 5, wherein the processor is further configured to:
after detecting an operation performed on the unhide operation item on the third user interface, delete, by the electronic device, the first file in the first folder, and change the media type of the picture in the first folder to a picture type; and
the touchscreen is further configured to, in coordination with a processor:
in response to the operation performed on the unhide operation item, display a fourth user interface on the electronic device, wherein the fourth user interface comprises the first album.

7. A non-transitory readable storage medium, wherein the computer storage medium stores one or more computer programs, and when the computer program is executed by an electronic device, a method is performed comprising:
after scanning a picture in a first folder, displaying, by an electronic device, a first user interface on the electronic device, wherein the first user interface comprises a first album that comprises the picture in the first folder, a quantity of times the first album has been hidden, and a hide operation item, wherein the hide operation item is used to hide the first album and the quantity of times which the first album has been hidden is from a server;
after detecting an operation performed on the hide operation item, adding, by the electronic device, a first file to the first folder, and changing a media type of the picture in the first folder to a non-media file type, wherein the first file is used to enable the electronic device to skip scanning the picture in the first folder; and
in response to the operation performed on the hide operation item, displaying, by the electronic device, a second user interface on the electronic device, wherein the second user interface is an interface obtained after the first album on the first user interface is hidden,
wherein the first folder is a cache folder,
wherein the first file is a nomedia file,
wherein the displaying by an electronic device, a first user interface on the electronic device comprises:
obtaining a set of suspected to-be-hidden albums proactively pushed by the server, and determining that the first album is a to-be-hidden album.

\* \* \* \* \*

UNITED STATES PATENT AND TRADEMARK OFFICE
CERTIFICATE OF CORRECTION

| | |
|---|---|
| PATENT NO. | : 11,481,357 B2 |
| APPLICATION NO. | : 17/283397 |
| DATED | : October 25, 2022 |
| INVENTOR(S) | : He et al. |

It is certified that error appears in the above-identified patent and that said Letters Patent is hereby corrected as shown below:

In the Claims

Claim 1: Column 22, Line 44: "wherein the first file is a nomedia file," should read -- wherein the first file is a .nomedia file, --.

Claim 4: Column 23, Line 29: "wherein the first file is a nomedia file," should read -- wherein the first file is a .nomedia file, --.

Claim 7: Column 24, Line 38: "wherein the first file is a nomedia file," should read -- wherein the first file is a .nomedia file, --.

Signed and Sealed this
Twenty-eighth Day of March, 2023

Katherine Kelly Vidal
*Director of the United States Patent and Trademark Office*